US009638853B2

(12) United States Patent
Starkey et al.

(10) Patent No.: US 9,638,853 B2
(45) Date of Patent: May 2, 2017

(54) ARTICLE OF MANUFACTURE WITH MICRO-FEATURES OF DIFFERING SURFACE ROUGHNESS

(71) Applicant: Rambus Delaware LLC, Brecksville, OH (US)

(72) Inventors: Kurt R. Starkey, Strongsville, OH (US); Robert M. Ezell, Brunswick, OH (US); Fumitomo Hide, San Jose, CA (US)

(73) Assignee: Rambus Delaware LLC, Brecksville, OH (US)

( * ) Notice: Subject to any disclaimer, the term of this patent is extended or adjusted under 35 U.S.C. 154(b) by 127 days.

(21) Appl. No.: 14/038,037

(22) Filed: Sep. 26, 2013

(65) Prior Publication Data

US 2014/0098566 A1    Apr. 10, 2014

Related U.S. Application Data

(60) Provisional application No. 61/710,865, filed on Oct. 8, 2012.

(51) Int. Cl.
*G02F 1/1335* (2006.01)
*F21V 8/00* (2006.01)
*G02B 5/02* (2006.01)

(52) U.S. Cl.
CPC ......... *G02B 6/0036* (2013.01); *G02B 5/0221* (2013.01); *G02B 6/0053* (2013.01); *G02B 6/0065* (2013.01); *G02B 6/0058* (2013.01)

(58) Field of Classification Search
CPC .... G02B 6/0058; G02B 6/005; G02B 6/0053; G02B 6/0036; G02B 6/0021; G02B 6/0038; G02B 6/0061
See application file for complete search history.

(56) References Cited

U.S. PATENT DOCUMENTS

| 6,036,327 | A    | 3/2000 | Blonder et al. |             |
|-----------|------|--------|-----------|------------------|
| 6,339,458 | B1 * | 1/2002 | Ohkawa ..... | G02B 6/0036    |
|           |      |        |           | 349/65           |
| 6,863,414 | B2 * | 3/2005 | Ho ....... | G02B 6/0038    |
|           |      |        |           | 362/23.16        |
| 7,009,771 | B2 * | 3/2006 | Bourdelais ...... | G02B 5/0221 |
|           |      |        |           | 359/454          |

(Continued)

OTHER PUBLICATIONS

International Search Report and Written Opinion of the International Searching Authority for related International Application No. PCT/US2013/061932 dated Feb. 7, 2014.

(Continued)

*Primary Examiner* — Peggy Neils
(74) *Attorney, Agent, or Firm* — Renner, Otto, Boisselle & Sklar, LLP

(57) ABSTRACT

An article of manufacture includes first and second micro-features of well-defined shape. In some embodiments, the article of manufacture is a light guide or redirecting film and the second micro-features are micro-optical elements configured to disrupt a specular optical path that includes the second micro-optical element. In other embodiments, the article of manufacture is a patterning tool for use in making an optical substrate. Embodiments of the optical substrate are formed by injection molding or embossing using the patterning tool.

21 Claims, 18 Drawing Sheets

(56) References Cited

U.S. PATENT DOCUMENTS

| | | | | |
|---|---|---|---|---|
| 7,207,708 B2* | 4/2007 | Tanaka | ................ | G02B 6/0036 |
| | | | | 362/619 |
| 8,696,188 B2* | 4/2014 | Chang | ................ | G02B 6/0036 |
| | | | | 362/625 |
| 8,786,804 B2* | 7/2014 | Sakamoto | ............ | G02B 6/0016 |
| | | | | 349/65 |
| 8,899,768 B2* | 12/2014 | Liu | ........................ | G02B 3/005 |
| | | | | 362/561 |
| 8,899,815 B2* | 12/2014 | Chen | .................... | G02B 6/0016 |
| | | | | 362/606 |
| 9,291,852 B2* | 3/2016 | Ryu | ................... | G02F 1/133606 |
| 2005/0122591 A1 | 6/2005 | Parker et al. | | |
| 2008/0232135 A1 | 9/2008 | Kinder et al. | | |
| 2010/0027293 A1* | 2/2010 | Li | ........................ | G02B 6/002 |
| | | | | 362/619 |
| 2010/0110331 A1 | 5/2010 | Han et al. | | |

OTHER PUBLICATIONS

International Preliminary Report on Patentability for related International Application No. PCT/US2013/061932 dated Apr. 8, 2015.

* cited by examiner

ARTICLE OF MANUFACTURE WITH MICRO-FEATURES OF DIFFERING SURFACE ROUGHNESS

RELATED APPLICATION DATA

This application claims the benefit of U.S. Provisional Patent Application No. 61/710,865 filed Oct. 8, 2012, the disclosure of which is herein incorporated by reference in its entirety.

BACKGROUND

Light emitting diodes (LEDs) show promise as an energy efficient light source for lighting assemblies. For some LED-based lighting assemblies, the light emitted from the light source is input to a light guide and light extracting elements specularly extract the light from the light guide in a defined direction. But the light extracting elements also provide an optically-specular path through which the light source is visible to a viewer. Reducing the visibility of the light source while maintaining the directional, specular light output is desirable in many applications.

DESCRIPTION

Figure 1:
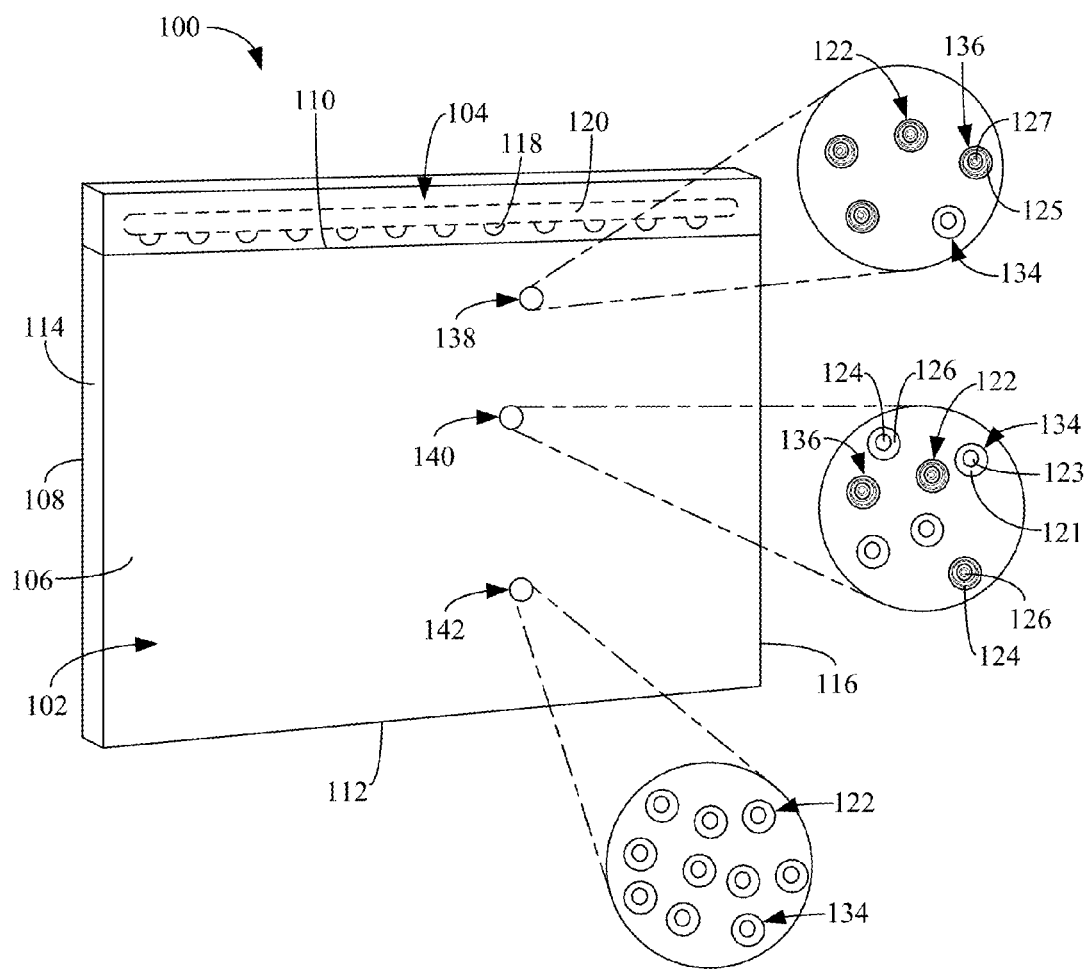
FIGS. 1-3 are schematic views of exemplary lighting assemblies.

Embodiments will now be described with reference to the drawings, wherein like reference numerals are used to refer to like elements throughout. The figures are not necessarily to scale. Features that are described and/or illustrated with respect to one embodiment may be used in the same way or in a similar way in one or more other embodiments and/or in combination with or instead of the features of the other embodiments. In this disclosure, angles of incidence, reflection, and refraction and output angles are measured relative to the normal to the surface.

In accordance with an aspect of the present disclosure, an article of manufacture includes a substrate having a major surface. A first micro-feature of well-defined shape is at the major surface of the substrate, the first micro-feature having a low surface roughness. A second micro-feature of well-defined shape is at the major surface of the substrate, the second micro-feature including a surface having a high surface roughness substantially greater than the low surface roughness. In some embodiments, the article of manufacture is a patterning tool such as a master, mother, shim, or embossing tool. In other embodiments, the substrate is an optical substrate such as a light guide or light redirecting film. Other aspects of the present disclosure are directed to making the article of manufacture.

With initial reference to FIG. 1, an exemplary embodiment of a lighting assembly is shown at 100. The lighting assembly 100 includes an optical substrate embodied as a light guide 102. The light guide 102 is a solid article of manufacture made from, for example, polycarbonate, poly (methyl-methacrylate) (PMMA), glass, or other appropriate material. The light guide 102 may also be a multi-layer light guide having two or more layers that may differ in refractive index. The light guide 102 includes a first major surface 106 and a second major surface 108 opposite the first major surface 106. The light guide 102 is configured to propagate light by total internal reflection between the first major surface 106 and the second major surface 108. The length and width dimensions of each of the major surfaces 106, 108 are greater, typically ten or more times greater, than the thickness of the light guide 102. The thickness is the dimension of the light guide 102 in a direction orthogonal to the major surfaces 106, 108.

At least one edge surface extends between the major surfaces 106, 108 of the light guide in the thickness direction. The total number of edge surfaces depends on the configuration of the light guide. In the case where the light guide is rectangular, the light guide has four edge surfaces 110, 112, 114, 116. Other light guide shapes result in a corresponding number of side edges. Depending on the shape of the light guide 102, each edge surface may be straight or curved, and adjacent edge surfaces may meet at a vertex or join in a curve. Moreover, each edge surface may include one or more straight portions connected to one or more curved portions. The edge surface 110 through which light from the light source 104 is input to the light guide will now be referred to as a light input edge. In some embodiments, the light guide 102 includes more than one light input edge.

In the illustrated embodiment, the major surfaces 106, 108 are planar. In other embodiments, at least a portion of the major surfaces 106, 108 of the light guide 102 is curved in one or more directions. In one example, the intersection of the light input edge 110 and one of the major surfaces 106, 108 defines a first axis, and at least a portion of the light guide 102 curves about an axis orthogonal to the first axis. In another example, at least a portion of the light guide 102 curves about an axis parallel to the first axis. Exemplary shapes of the light guide include a dome, a hollow cylinder, a hollow cone or pyramid, a hollow frustrated cone or pyramid, a bell shape, an hourglass shape, or another suitable shape.

The lighting assembly 100 includes a light source 104 positioned adjacent the light input edge 110. The light source 104 is configured to edge light the light guide 102 such that light from the light source enters the light input edge 110 and propagates along the light guide 102 by total internal reflection at the major surfaces 106, 108. The light source 104 includes one or more solid-state light emitters 118. The solid-state light emitters 118 constituting the light source 104 are arranged linearly or in another suitable pattern depending on the shape of the light input edge 110 of the light guide 102 to which the light source 104 supplies light.

The light guide 102 includes micro-features of well-defined shape embodied as micro-optical elements 122 in, on, or beneath at least one of the major surfaces 106, 108. Micro-optical elements that are in, on, or beneath a major surface will be referred to as being "at" the major surface. The micro-optical elements 122 are features of well-defined shape that predictably reflect or refract the light propagating in the light guide 102. In some embodiments, at least one of the micro-optical elements 122 is an indentation in the major surface 106, 108 of well-defined shape. In other embodiments, at least one of the micro-optical elements 122 is a protrusion from the major surface 106, 108 of well-defined shape.

A micro-optical element or micro-feature of well-defined shape is a three-dimensional feature recessed into a major surface or protruding from a major surface having clean and distinct surfaces on a scale larger than the surface roughness of the surfaces. Micro-optical elements and micro-features of well-defined shape exclude features of indistinct shape or surface textures, such as printed features of indistinct shape, ink-jet printed features of indistinct shape, selectively-deposited features of indistinct shape, and features of indistinct shape wholly formed by chemical etching or laser etching.

Each micro-optical element 122 functions to disrupt the total internal reflection of the light propagating in the light guide and incident thereon. In one embodiment, the micro-optical elements 122 reflect light toward the opposing major surface so that the light exits the light guide 102 through the opposing major surface. Alternatively, the micro-optical elements 122 transmit light through the micro-optical elements 122 and out of the major surface of the light guide 102 having the micro-optical elements 122. In another embodiment, both types of micro-optical elements 122 are present. In yet another embodiment, the micro-optical elements 122 reflect some of the light and refract the remainder of the light incident thereon. Therefore, the micro-optical elements 122 are configured to extract light from the light guide 102 through one or both of the major surfaces 106, 108.

The micro-optical elements 122 are configured to extract light in a defined intensity profile (e.g., a uniform intensity profile) and with a defined light ray angle distribution from one or both of the major surfaces 106, 108. In this disclosure, intensity profile refers to the variation of intensity with position within a light-emitting region (such as the major surface or a light output region of the major surface). The term light ray angle distribution is used to describe the variation of the intensity of light with ray angle (typically a solid angle) over a defined range of light ray angles. In an example in which the light is emitted from an edge-lit light guide, the light ray angles can range from −90° to +90° relative to the normal to the major surface.

Micro-optical elements 122 are small relative to the linear dimensions of the major surfaces 106, 108. The smaller of the length and width of a micro-optical element 122 is less than one-tenth of the longer of the length and width (or circumference) of the light guide 102 and the larger of the length and width of the micro-optical element 122 is less than one-half of the smaller of the length and width (or circumference) of the light guide 102. The length and width of the micro-optical element 122 is measured in a plane parallel to the major surface 106, 108 of the light guide 102 for planar light guides or along a surface contour for non-planar light guides 102.

Light guides 102 having micro-optical elements 122 are typically formed by a process such as injection molding. Injection molding is known in the art, and typically utilizes a patterning tool for forming the micro-optical elements 122 at the major surface 106, 108 of the light guide 102. An exemplary injection molding process is described below.

The micro-optical elements 122 can be any suitable shape, and embodiments of the light guide 102 can include more than one type of micro-optical element. For example, the light guide 102 shown in FIG. 1 includes first micro-optical elements 134 and second micro-optical elements 136. In another example shown in FIG. 3, the light guide 102 includes micro-optical elements of different shapes. Accordingly, the reference numeral 122 will be generally used to collectively refer to the different embodiments of micro-optical elements.

FIG. 1 shows an exemplary embodiment of the light guide 102 including frustoconical-shaped micro-optical elements 122. Each frustoconical-shaped micro-optical element 122 includes a side surface 124 and an end surface 126. The reference numeral 124 will be generally used to collectively refer to the different embodiments of the side surface, and the reference numeral 126 will be generally used to collectively refer to the different embodiments of the end surface. In the embodiment shown, the micro-optical elements 122 are embodied as protrusions of well-defined shape, and the side surface 124 extends from the major surface 106 and the end surface 126 extends in a direction nominally parallel to the major surface 106.

Figure 2:
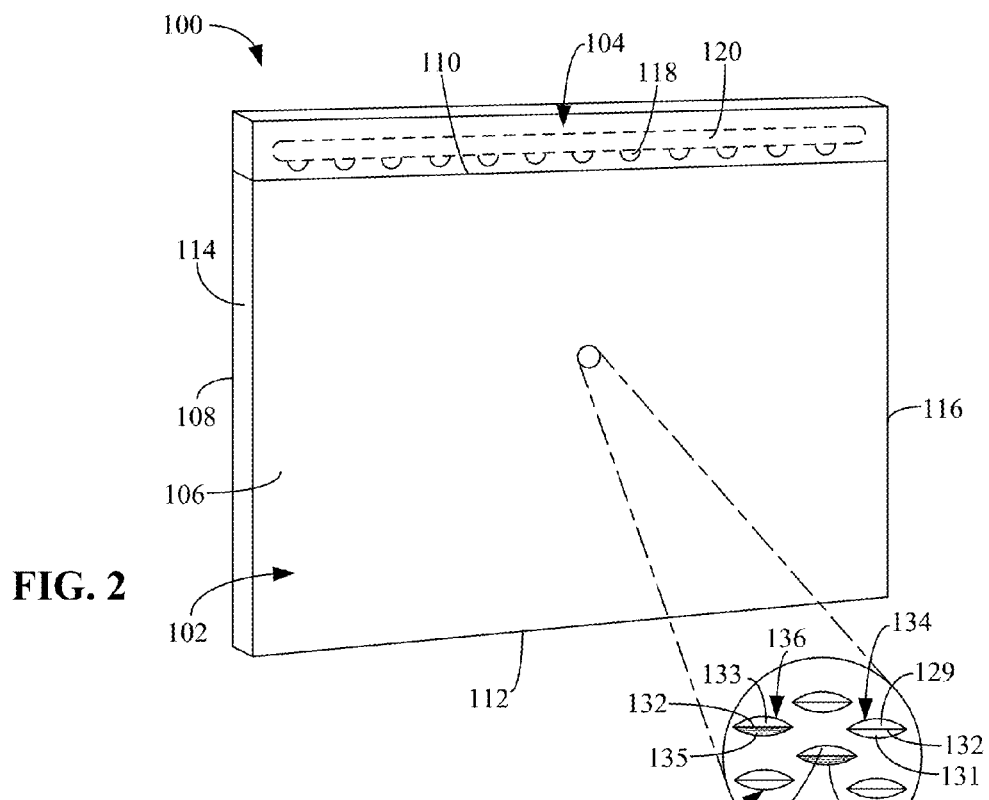

FIG. 2 shows an exemplary embodiment of the light guide 102 including an example of micro-optical elements 122 configured as v-groove-shaped depressions having an arcuate ridge, hereinafter referred to as "football-shaped." Such micro-optical elements may alternatively be configured as v-groove-shaped protrusions with an arcuate ridge. Each football-shaped micro-optical element 122 includes a first side surface 128 and a second side surface 130 that come together to form a ridge 132 having ends that intersect the one of the major surfaces 106, 108 at which the micro-optical element 122 is formed. The reference numeral 128 will be generally used to collectively refer to the different embodiments of the first side surface, and the reference numeral 130 will be generally used to collectively refer to the different embodiments of the second side surface. The second side surface 130 is further from the light input edge 110 than the first side surface 128.

In some embodiments, at least one of the first side surface 128 and the second side surface 130 is curved. In other embodiments, at least one of the first side surface 128 and the second side surface 130 is planar. Micro-optical elements 122 including a first side surface that is a curved surface and a second side surface is a planar surface are hereinafter referred to as "wedge shaped." Although not specifically shown, in embodiments where the micro-optical element is a protrusion, the planar surface is typically arranged further from the light input edge than the curved surface, and in embodiments where the micro-optical element is an indentation, the planar surface is typically arranged closer to the light input edge than the curved surface.

Figure 3:
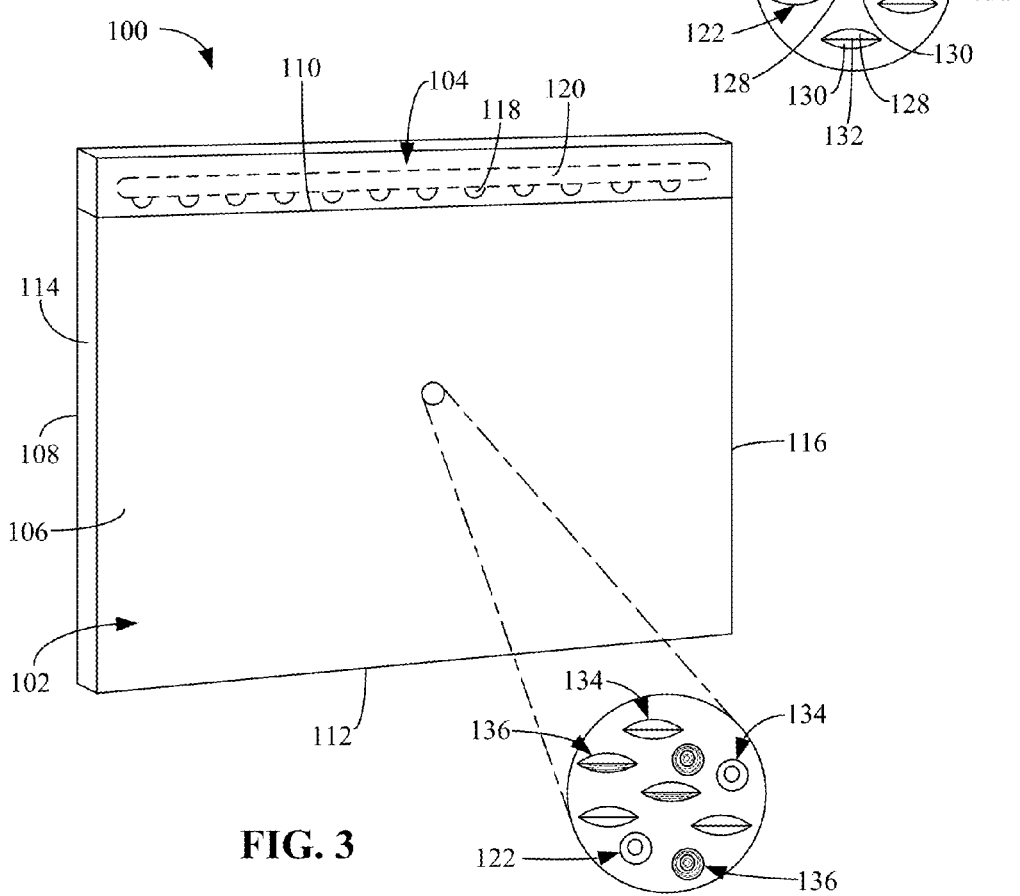

FIG. 3 shows an exemplary embodiment of the light guide 102 including both frustoconical-shaped micro-optical elements 122 and football-shaped micro-optical elements 122.

Other exemplary embodiments of the light guide 102 may include micro-optical elements 122 having other suitable shapes. Exemplary micro-optical elements 122 are described in U.S. Pat. No. 6,752,505, the entire content of which is incorporated by reference, and, for the sake of brevity, are not described in detail in this disclosure.

Each micro-optical element 122 includes at least one surface configured to refract or reflect light propagating in the light guide and incident thereon such that the light is extracted from the light guide. Such surface(s) is also herein referred to as a light-redirecting surface. With exemplary reference to the frustoconical-shaped micro-optical element 122 shown in FIG. 1, at least one of the side surface 124 and the end surface 126 is a light-redirecting surface. With exemplary reference to the football-shaped micro-optical element 122 shown in FIG. 2, at least one of the first side surface 128 and the second side surface 130 is a light-redirecting surface.

The light guide 102 includes first micro-optical elements 134 having a low surface roughness. In this disclosure, the term "low surface roughness" refers to a defined surface roughness suitable for specularly reflecting or refracting incident light. In one embodiment, the low surface roughness is an average surface roughness ($R_l$) less than about 0.10 µm. In another embodiment, the low surface roughness is an average surface roughness ($R_l$) less than about 0.08 µm. In another embodiment, the low surface roughness is an average surface roughness ($R_l$) less than about 0.05 µm.

Figure 4:
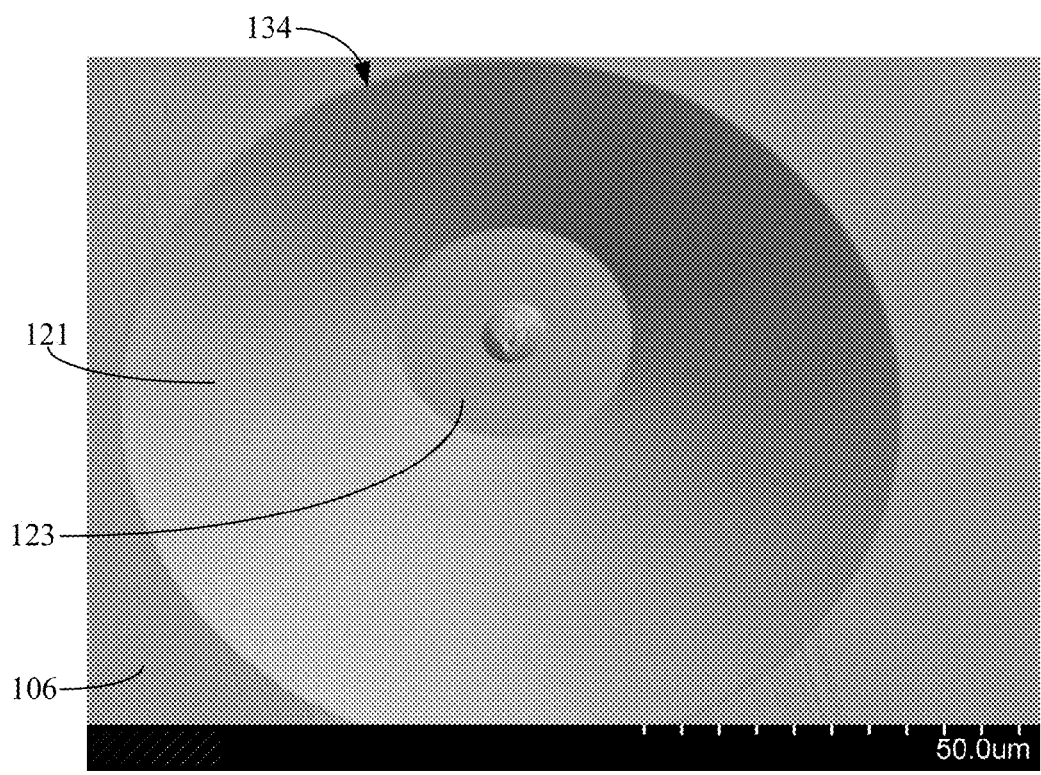
FIG. 4 is a scanning electron microscope ("SEM") image of an exemplary micro-optical element.
Figure 5:
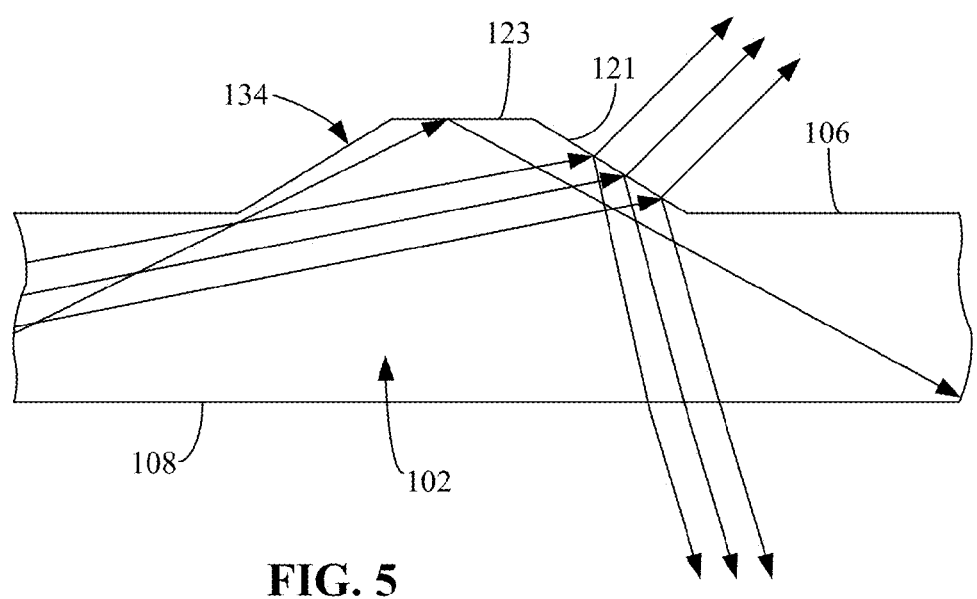
FIG. 5 is a schematic view showing part of an exemplary lighting assembly.

An exemplary embodiment of a frustoconical-shaped first micro-optical element 134 is shown in FIGS. 1, 4, and 5. The side surface 121 and the end surface 123 of each first micro-optical element 134 have a low surface roughness. The side surface 121 specularly reflects a first portion of the light propagating in the light guide and incident thereon in a defined direction toward the major surface 108, and specularly refracts a second portion of the light propagating in the light guide and incident thereon through the side surface 121 in a defined direction. The refracted and reflected light is extracted from the major surfaces 106, 108 of the light guide 102. Light incident on the end surface 123 is totally internally reflected.

Light guides including the first micro-optical elements 134 that specularly extract the light from the light guide in a defined direction also include an optically-specular path extending from the light input edge 110 of the light guide 102. Reflections of the light source 104 as viewed through the optically-specular path are visible to a viewer viewing the lighting assembly 100. Therefore, even if the first micro-optical elements 134 are arranged to extract light in a uniform intensity profile over the major surface 106, 108, since the array of light sources 104 is not a uniform light source, the optically-specular path creates the visual effect of one or more relatively high-intensity columns of light extending along the light guide 102 from the light input edge 110. This visual effect is also referred to herein as a "headlighting" effect.

While the headlighting effect can be reduced by one or more optical adjusters (not shown) (e.g., a diffusing film) located adjacent one or both of the major surfaces 106, 108, the use of the optical adjusters for such purpose destroys the directional, specular light output distribution of the light output from the lighting assembly 100. Furthermore, in many applications, the use of an optical adjuster is not preferable (e.g., for aesthetic reasons).

In accordance with the present disclosure, and with exemplary reference to FIGS. 1-3, the light guide 102 additionally includes second micro-optical elements 136 that are configured to reduce or eliminate the headlighting effect by disrupting the optically-specular path extending from the light input edge 110. The second micro-optical elements 136 disrupt the image of the light source 104 and provide the visual effect of a nominally uniform light output proximate the light input edge 110 to a viewer viewing the lighting assembly 100. The second micro-optical elements 136 additionally provide partial ray angle control of the light extracted from the light guide 102 while also reducing the specular component of the light output distribution from the lighting assembly 100.

Each of the second micro-optical elements 136 includes at least one surface having a high surface roughness. In this disclosure, the term "high surface roughness" refers to a defined surface roughness suitable for imparting a diffuse component to incident light that is reflected or refracted. The high surface roughness is greater than the low surface roughness of the first micro-optical elements 134. The high surface roughness is a defined roughness intentionally imparted to the at least one surface of each second micro-optical element 136. In one embodiment, the high surface roughness is an average surface roughness ($R_h$) ranging from about 1 µm to about 5 µm. In another embodiment, the high surface roughness is an average surface roughness ($R_h$) ranging from about 3 µm to about 5 µm. In another embodiment, the high surface roughness is an average surface roughness ($R_h$) ranging from about 1 µm to about 3 µm.

In this disclosure, the term "surface roughness" of a micro-feature or of a micro-optical element refers to the surface roughness of the roughest surface of the micro-feature or micro-optical element. For example, a second micro-optical element 136 is referred to as having a high surface roughness in embodiments where at least one surface of the second micro-optical element 136 has a high surface roughness.

In some embodiments, the second micro-optical elements 136 have nominally the same surface roughness. In other embodiments, the second micro-optical elements 136 mutually differ in surface roughness, but the difference in the surface roughness among the second micro-optical elements 136 is substantially less than the difference between the average surface roughness ($R_{havg}$) of the high surface roughness surface(s) of the second micro-optical elements 136 and the average surface roughness ($R_{lavg}$) of the first micro-optical elements 134.

Figure 6:
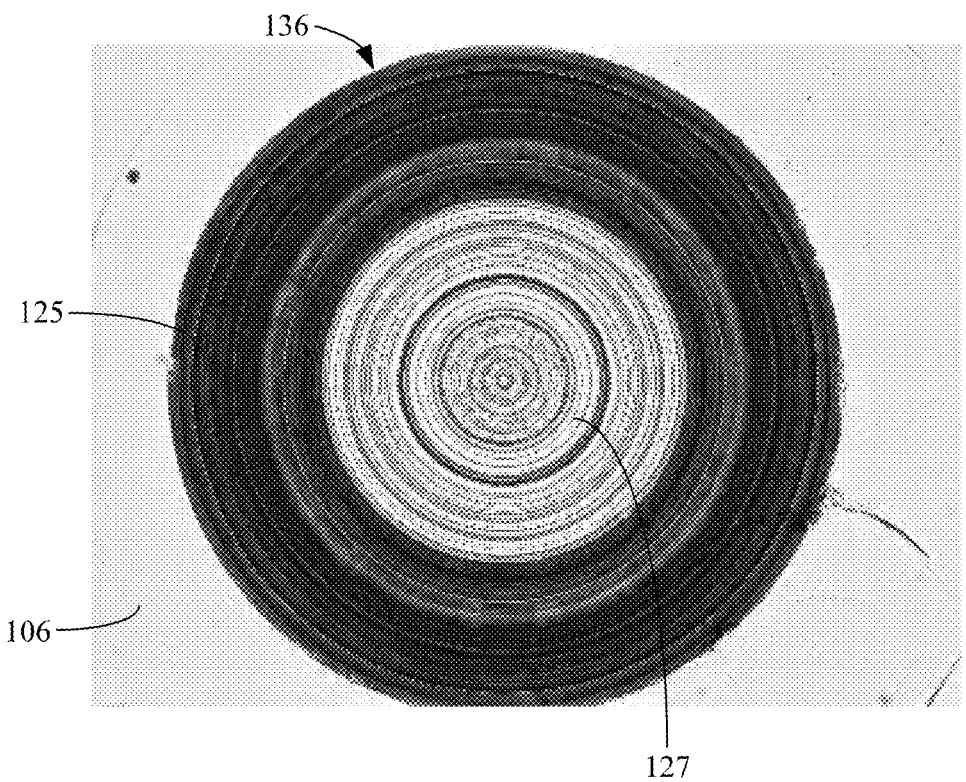
FIG. 6 is an SEM image of an exemplary micro-optical element.
Figure 7:
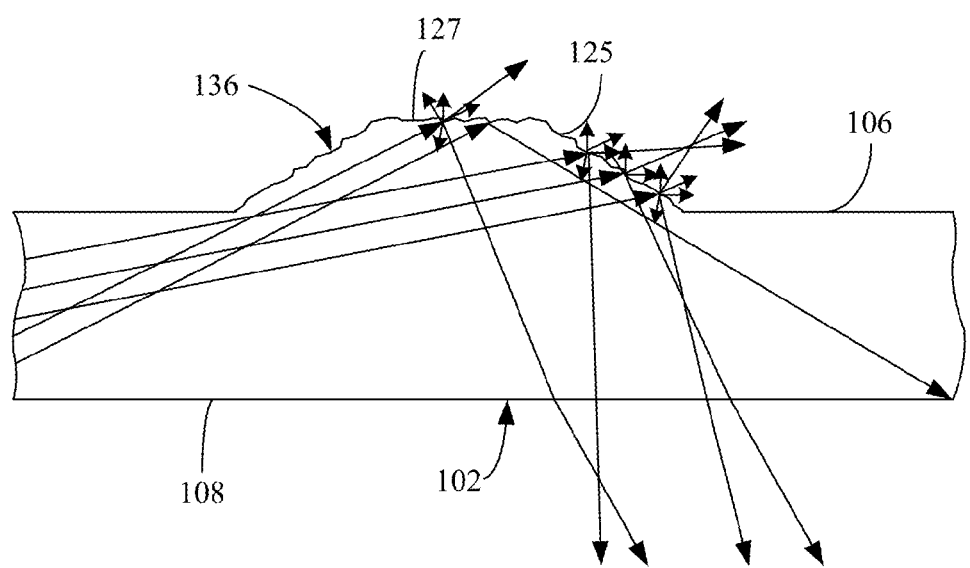
FIG. 7 is a schematic view showing part of an exemplary lighting assembly.

An exemplary embodiment of a frustoconical-shaped second micro-optical element 136 is shown in FIGS. 1, 6, and 7. The second micro-optical element 136 has nominally the same shape as the first micro-optical element 134 shown in FIGS. 1, 4, and 5. However, the side surface 125 and the end surface 127 of the second micro-optical element 136 each have a high surface roughness. In the example shown, the high surface roughness is provided by concentric (circumferential) grooves in the side surface 125 and concentric grooves in the end surface 127. In other embodiments, only one of the side surface 125 and the end surface 127 has a high surface roughness.

With specific reference to FIG. 7, the side surface 125 reflects a first portion of the light propagating in the light guide and incident thereon in a direction toward the major surface 108, and refracts a second portion of the light propagating in the light guide and incident thereon through the side surface 125. The end surface 127 reflects a first portion of the light propagating in the light guide and incident thereon in a direction toward the major surface 108, and refracts a second portion of the light propagating in the light guide and incident thereon through the end surface 127. Some of the light incident on the side surface 125 and end surface 127 is internally reflected and continues to propagate within the light guide 102. The high surface roughness of the second micro-optical element 136 disrupts the specular reflection and the specular refraction of the light incident on the second micro-optical element 136. Accordingly, optical paths that include the second optical element 136 are less specular than optical paths that include the first micro-optical element 134.

FIGS. 2 and 3 schematically show exemplary embodiments of football-shaped first micro-optical elements 134 and football-shaped second micro-optical elements 136. The first micro-optical elements 134 each include a first side surface 129 and a second side surface 131. The second micro-optical elements each include a first side surface 133 and a second side surface 135. The football-shaped second micro-optical elements 136 have nominally the same shape as the football-shaped first micro-optical elements 134 shown in FIGS. 2 and 3. However, the second side surface 135, further from the light source 104, of each second micro-optical element 136 has a high surface roughness greater than the low surface roughness of the first micro-optical elements 134. In the example shown, the high surface roughness is provided by arcuate grooves in the second side surface 135. The high surface roughness of the second side surface 135 of the second micro-optical element 136 alters the optical characteristics of the second side surface 135 such that the second side surface 135 reflects and refracts light partially specularly and partially diffusely. In other embodiments, both the first side surface 133 and the second side surface 135 of each second micro-optical element 136 have a high surface roughness.

The high surface roughness of the second micro-optical elements 136 imparts a diffuse (e.g., lambertian) component to the light extracted from the light guide 102 by the second micro-optical elements 136. Accordingly, the high surface roughness of the second micro-optical elements 136 provides a defined broadening of the peak of the light ray angle distribution of the light extracted from the light guide 102. The light extracted by the second micro-optical elements 136 has a second light ray angle distribution broader than the first light ray angle distribution. But the diffuse component of the light extracted by the second micro-optical elements 136 is small enough that the extracted light still has a light ray angle distribution with a well-defined peak direction.

The broader light ray angle distribution of the light extracted by the second micro-optical elements 136 does slightly reduce the directional, specular output of the light extracted from the light guide 102 as a whole. Thus, the density of the second micro-optical elements 136 at the major surface 106, 108 is only that which is sufficient to provide an effective reduction of the headlighting effect while maintaining an overall directional light output of the lighting assembly 100. Additionally, light that is internally reflected by the second micro-optical elements 136 has a diffuse component that reduces headlighting in regions of the panel further from the light input edge 110. Also, the headlighting effect manifests more strongly in close proximity to the light input edge 100. Therefore, the percentage of micro-optical elements 122 that are second micro-optical elements 136 is typically highest proximate the light input edge 110, and typically decreases with increasing distance from the light input edge 110. The percentage of micro-optical elements 122 that are second micro-optical elements 136 is the number of second micro-optical elements 136 in a unit area of the major surface of the light guide multiplied by one hundred and divided by the total number of micro-optical elements 122 in such unit area.

FIG. 1 shows exemplary first and second micro-optical elements 134, 136 at the major surface 106 at different distances from the light input edge 110. At a position 138 proximate the light input edge 110, the density of micro-optical elements 122 is lowest, and the percentage of the micro-optical elements 122 that are second micro-optical elements 136 is highest. At a position 140 further from the light input edge 110, the micro-optical elements 122 have a higher density than at position 138, but the percentage of the micro-optical elements 122 that are second micro-optical elements 136 is lower than at the position 138. At a position 142 still further from the light input edge 110, the density of the micro-optical elements 122 is higher than at positions 138 and 140, but the percentage of the micro-optical elements 122 that are second micro-optical elements 136 is lower than at the positions 138 and 140. In the example shown, none of the micro-optical elements 122 in the region of the major surface 106 shown at position 142 is a second micro-optical element 136. Thus, in the example shown in FIG. 1, the percentage of the micro-optical elements 122 that are second micro-optical elements 136 varies in the direction orthogonal to the light input edge 110.

In some embodiments, the surface roughness of the second micro-optical elements 136 varies with distance from the light input edge 110. The variation in surface roughness may be progressive or step wise. In an example, the second micro-optical elements 136 decrease in surface roughness with increasing distance from the light input edge 110. In such embodiments, the diffuse component imparted to the light extracted from the light guide 102 by a second micro-optical elements 136 at a position proximate the light input edge 110 (e.g., position 138) is greater than the diffuse component imparted to the light extracted by a second micro-optical element 136 distal the light input edge 110 (e.g., position 140 or 142).

In some embodiments, at least in a region proximate to the light input edge 110, the percentage of the micro-optical elements 122 that are second micro-optical elements 136 additionally varies with distance from an edge 114, 116 adjacent the light input edge 110. In an example, the percentage of the micro-optical elements 122 that are second micro-optical elements 136 varies cyclically with distance from the edge 114, 116. The cyclic variation has a spatial wavelength corresponding to the pitch between adjacent ones of the solid-state light emitters 118 and a phase such that the percentage is greater in front of each solid-state light emitter 118 than at locations mid-way between adjacent solid-state light emitters 118. Additionally or alternatively, the surface roughness of the second micro-optical elements 136 varies with distance from the edges 114, 116 adjacent the light input edge 110. In an example, the surface roughness of the second micro-optical elements varies with distance from the edge 114, 116. The variation is such that the surface roughness of the second micro-optical elements is greater in front of each solid-state light emitter 118 than at locations approximately mid-way between adjacent solid-state light emitters 118.

Figure 8:
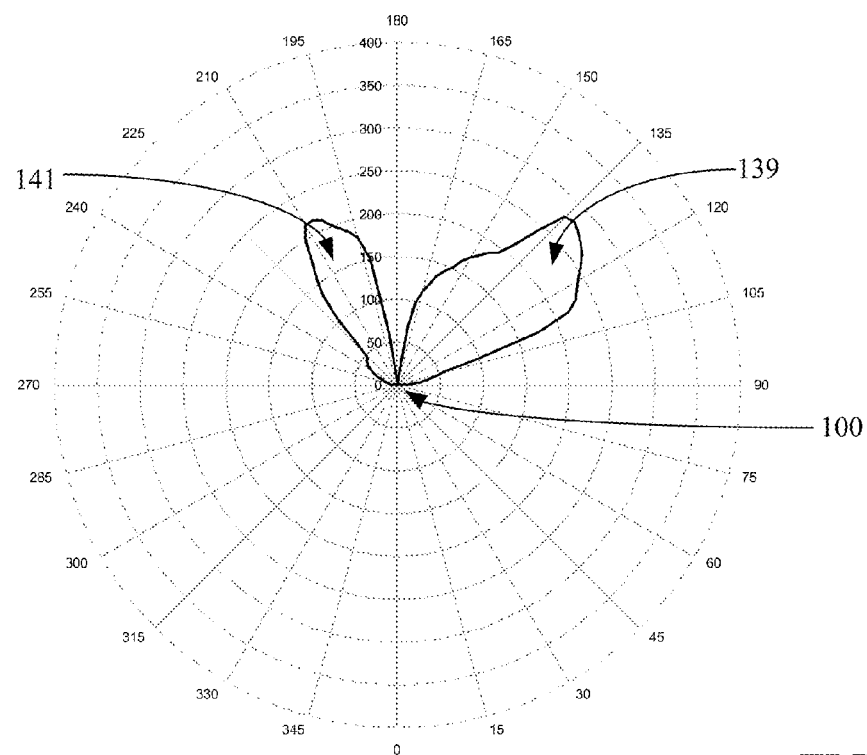
FIGS. 8 and 9 are output distribution profiles of exemplary micro-optical elements.
Figure 9:
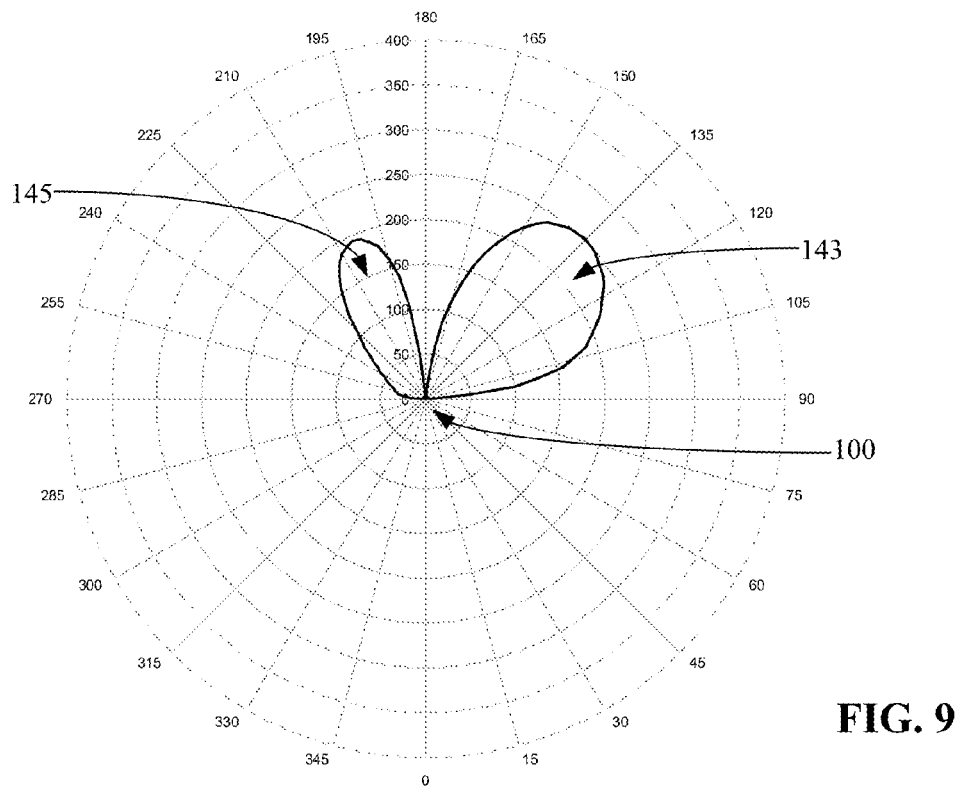

The difference in light ray angle distribution between light extracted by the first micro-optical elements and light extracted by the second micro-optical elements is exemplified in FIGS. 8 and 9. Specifically, FIG. 8 shows an exemplary far-field light ray angle distribution of light extracted from the lighting assembly 100 of FIG. 1 by the first micro-optical elements 134 in a plane orthogonal to the light input edge 110 and to the major surfaces 106, 108. The degree scale represents azimuth relative to the surface normal. The light source 104 is arranged at 0°, the major surface 106 is arranged proximate 270°, and the major surface 108 is arranged proximate 90°. Referring additionally to FIG. 1, the first micro-optical elements 134 specularly reflect a first portion 139 of the light input to the light guide 102 from the light source 104 through the major surface 108 of the light guide 102 with a ray angle distribution having a full width half maximum of about 50° and a peak intensity at about 45° to the surface normal. The first micro-optical elements 134 also specularly refract a second portion 141 of the light input to the light guide 102 from the light source 104 through the major surface 106 of the light guide 102 with a light ray angle distribution having a full width half maximum of about 30° and a peak at about 25° to the surface normal. In the example shown in FIG. 8, a greater portion of the light incident the first micro-optical elements 134 is output from the light guide 102 through the major surface 108 than through the major surface 106.

FIG. 9 shows an exemplary far-field light ray angle distribution of light extracted from the lighting assembly of FIG. 1 by the second micro-optical elements 136 in a plane orthogonal to the light input edge 110 and to the major surfaces 106, 108. The second micro-optical elements 136 specularly reflect a first portion 143 of the light input to the light guide 102 from the light source 104 through the major surface 108 of the light guide 102 with a ray angle distribution having a full width half maximum of about 50° and a peak intensity at about 45° to the surface normal. The second micro-optical elements 136 also specularly refract a second portion 145 of the light input to the light guide 102 from the light source through the major surface 106 of the light guide 102 with a light ray angle distribution having a full width half maximum of about 30° and a peak at about 25° to the surface normal. The high surface roughness of the second micro-optical element 136 introduces a diffuse component to the extracted light that results in the broadening of the light ray angle distribution. A greater portion of the light incident the second micro-optical elements 136 is output from the light guide through the major surface 106 as compared with the light extracted by the first micro-optical elements 134 (shown in FIG. 8).

Figure 10:
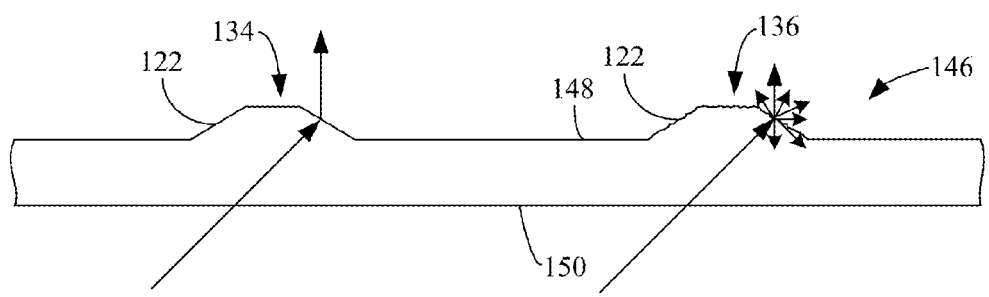
FIG. 10 is a schematic view showing part of an exemplary lighting assembly.

In the embodiments described above, the optical substrate of the lighting assembly 100 is embodied as a light guide 102 including first and second micro-optical elements 134, 136 at the major surface 106, 108. In the embodiment shown in FIG. 10, the optical substrate is embodied as a light redirecting film 146. The light redirecting film 146 includes micro-features embodied as first and second micro-optical elements 134, 136 at the major surface 148 thereof. Light is typically incident on the major surface 150 at a substantial angle to the normal to the major surface, is transmitted through the light redirecting film 146, and is incident the first micro-optical elements and the second micro-optical elements. The first micro-optical elements 134 specularly refract the incident light in a defined direction closer to the normal to the major surface 150. The second micro-optical elements 136 similarly refract the incident light and additionally impart a diffuse component to the refracted light. In typical embodiments of light redirecting film 146, the percentage of the micro-optical elements 122 that are second micro-optical elements 136 and/or the surface roughness of the second micro-optical elements 122 is substantially uniform over the major surface 148.

Light-redirecting films having micro-optical elements 122 are typically formed by a process such as embossing. Embossing is known in the art, and typically utilizes a patterning tool embodied as a stamper, roll, or belt to form the light-redirecting film from a stock material. An exemplary embossing process is described below.

Lighting assemblies in accordance with the present disclosure are configurable for use in various applications and may include additional components. For example, although not specifically shown in detail, in some embodiments of the lighting assembly, the light source 104 includes structural components to retain the solid-state light emitters 118. In the examples shown in FIGS. 1-3, the solid-state light emitters 118 are mounted to a printed circuit board (PCB) 120. The light source 104 may additionally include circuitry, power supply, electronics for controlling and driving the solid-state light emitters 118, and/or any other appropriate components.

Exemplary solid-state light emitters 118 include such devices as LEDs, laser diodes, and organic LEDs (OLEDs). In an embodiment where the solid-state light emitters 118 are LEDs, the LEDs may be top-fire LEDs or side-fire LEDs, and may be broad spectrum LEDs (e.g., white light emitters) or LEDs that emit light of a desired color or spectrum (e.g., red light, green light, blue light, or ultraviolet light), or a mixture of broad-spectrum LEDs and LEDs that emit narrow-band light of a desired color. In one embodiment, the solid-state light emitters 118 emit light with no operably-effective intensity at wavelengths greater than 500 nanometers (nm) (i.e., the solid-state light emitters 118 emit light at wavelengths that are predominantly less than 500 nm). In some embodiments, the solid-state light emitters 118 constituting light source 104 all generate light having the same nominal spectrum. In other embodiments, at least some of the solid-state light emitters 118 constituting light source 104 generate light that differs in spectrum from the light generated by the remaining solid-state light emitters 118. For example, two different types of solid-state light emitters 118 are alternately located along the light source 104.

Figure 11:
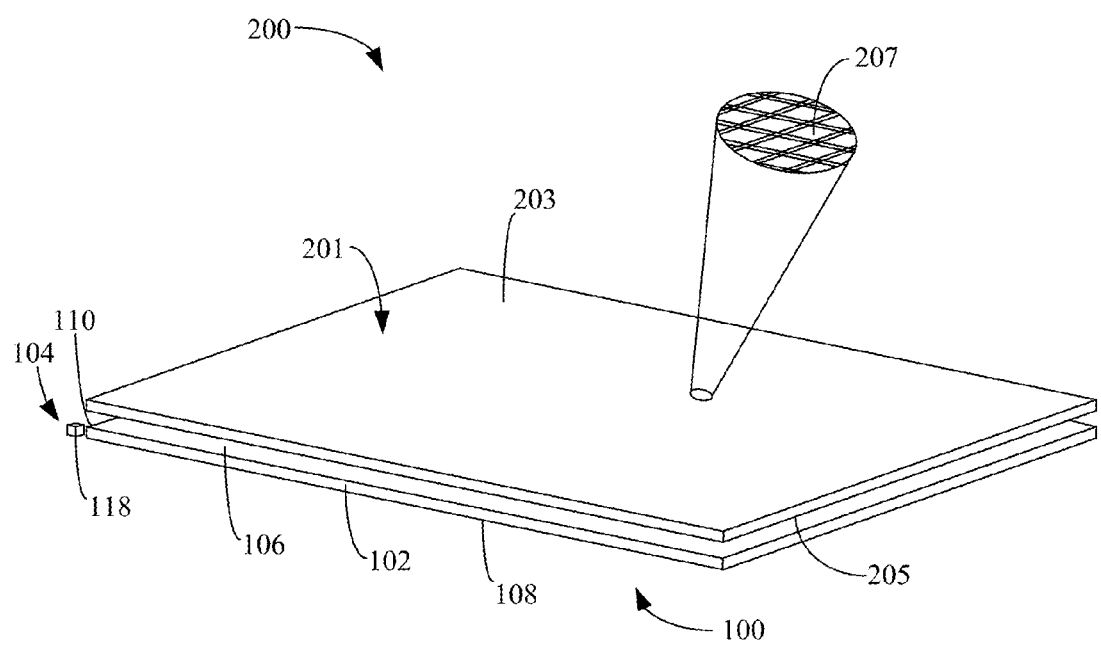
FIG. 11 is a schematic view of a display apparatus including an exemplary lighting assembly.

In some embodiments, the lighting assembly 100 is a part of a lighting fixture, a sign, or a display apparatus. FIG. 11 shows an exemplary embodiment of the lighting assembly 100 as a part of an exemplary display apparatus 200. The display apparatus 200 includes a display 201 having opposed major surfaces 203, 205 and an array of light valves 207 configured to produce images in response to a video signal. The lighting assembly is proximate the major surface 205 of the display 201. The array of light valves 207 is back lit by the lighting assembly 100.

The first micro-optical elements 134 and the second micro-optical elements 136 may be formed directly in the light guide 102 or the light redirecting film 146. However, other techniques that typically involve the use of one or more patterning tools are typically used to mass produce light guides 102 and light redirecting films 146 with first and second micro-optical elements 134, 136.

Figure 12:
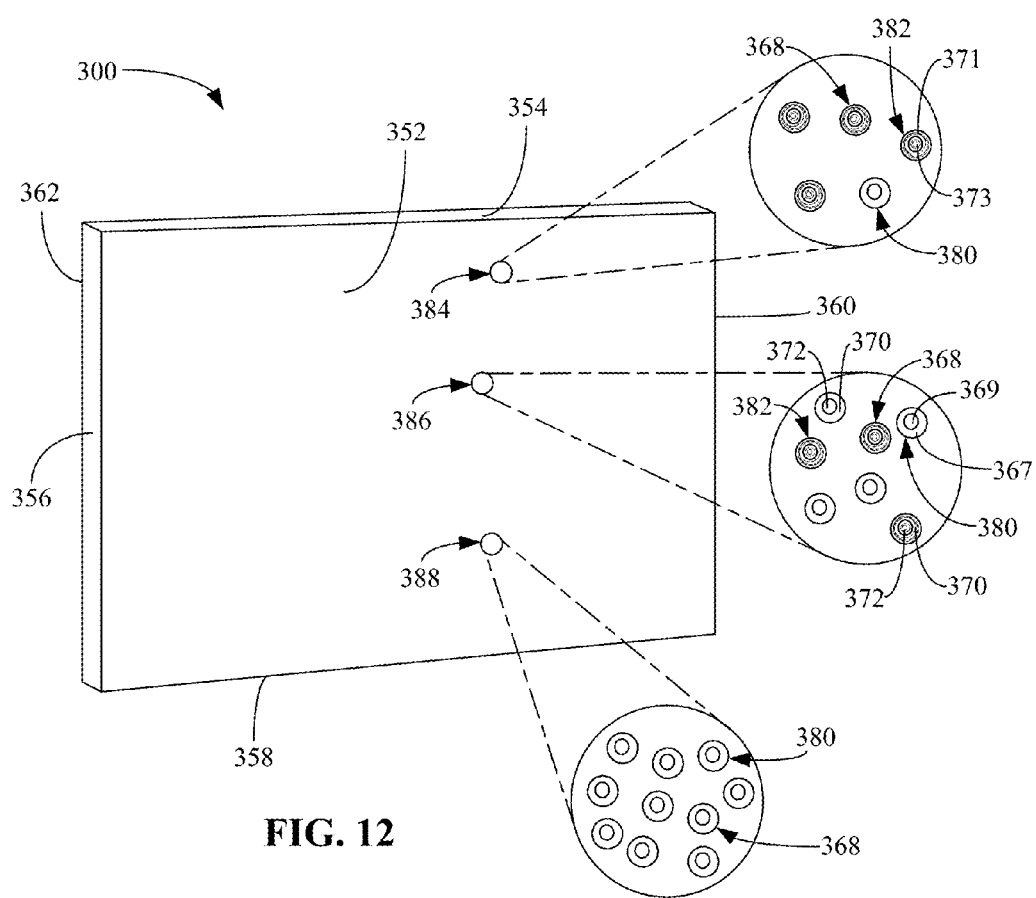
FIGS. 12-14 are schematic views of exemplary patterning tools for use in making an optical substrate.
Figure 13:
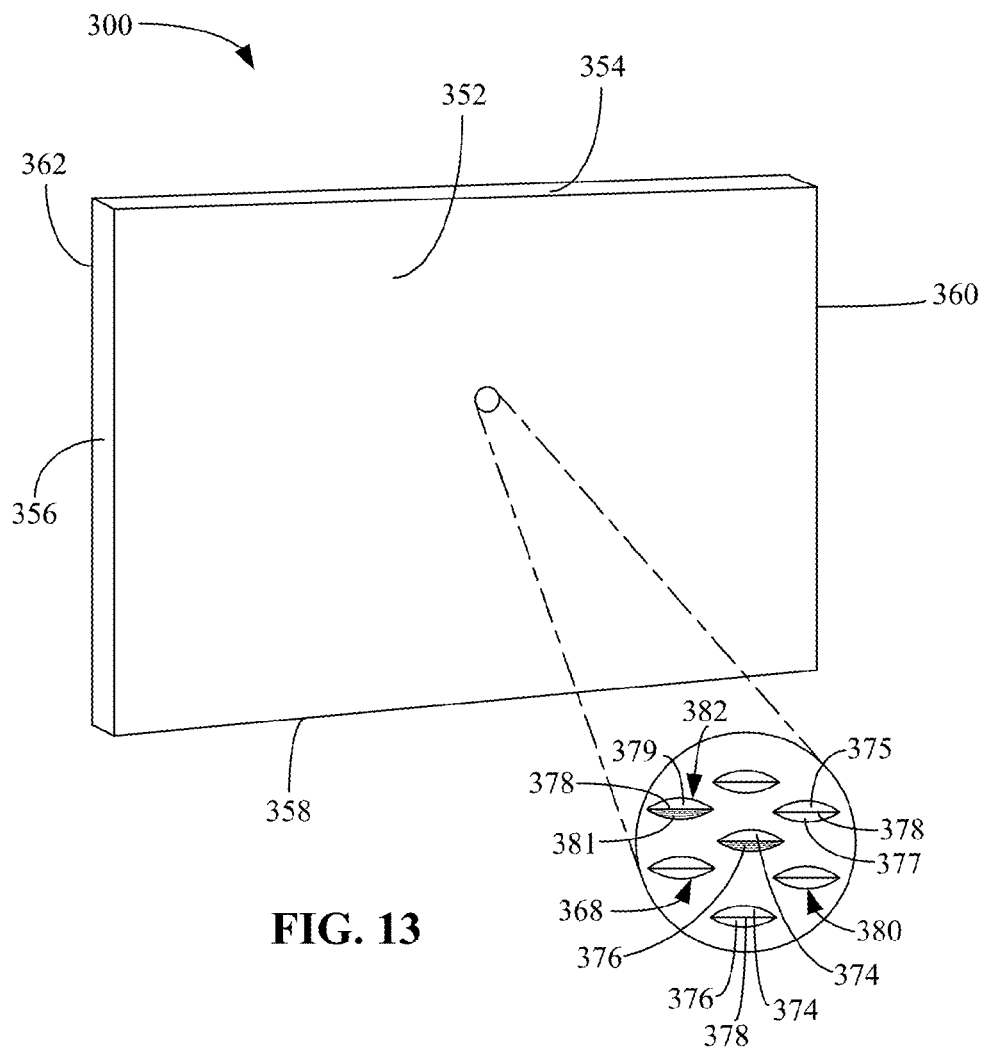
Figure 14:
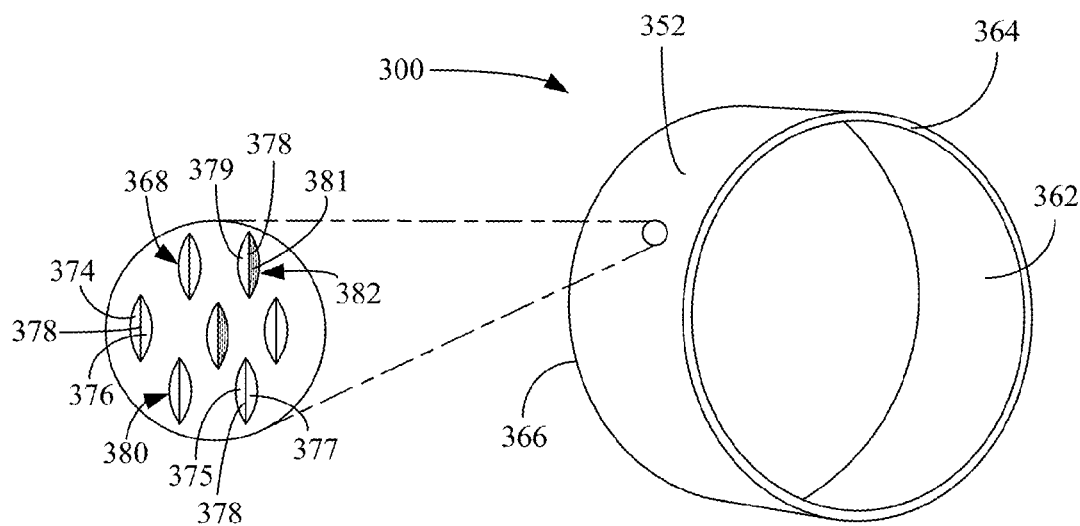

With reference to FIGS. 12-14, exemplary patterning tools for making an optical substrate, such as a light guide or a light redirecting film, are shown at 300. The patterning tool 300 is a substrate embodied as a solid article made from, for example, metal, acrylic, polycarbonate, PMMA, or other appropriate material. In embodiments wherein a patterning tool 300 is for use directly in molding, embossing, or the like, the patterning tool 300 is generally made from metal. In other embodiments, a metal, glass or plastic patterning tool, typically referred to as a "master", is made and then is electroplated to form another patterning tool, typically referred to as a "mother". The mother may be for use in molding, or the like; or may be electroplated to form another patterning tool, typically referred to as a "shim", for use in molding, or the like. Additionally or alternatively, the mother is electroplated to form a patterning tool, typically referred to as an embossing tool, for use in embossing and the like. The term "patterning tool" is used herein as a generic term to encompass a master, a mother, a shim, an embossing tool, and other tools used directly or indirectly in the production of light guides and light redirecting films having first micro-optical elements and second micro-optical elements differing in surface roughness.

The patterning tool 300 includes a major surface 352. In some embodiments (FIGS. 12 and 13), the major surface 352 of the patterning tool 300 is planar (i.e., the major surface is not curved). In other embodiments (FIG. 14), at least a portion of the major surface 352 of the patterning tool 300 is curved in one or more directions. The patterning tool 300 includes at least one edge surface that bounds the major surface 352, the total number of edge surfaces depending on the configuration of the patterning tool 300. In the embodiment shown in FIGS. 12 and 13, the patterning tool 300 is rectangular in shape and includes four edges 354, 356, 358, 360 extending between the major surface 352 and an opposed major surface 362. In the embodiment shown in FIG. 14, the patterning tool 300 is a belt and includes two edges 364, 366. In other embodiments, the patterning tool may be shaped as a disk, a dome, a cone or pyramid, a frustrated cone or pyramid, or another suitable shape.

The patterning tool 300 includes micro-features 368 in or on the major surface 352. Each micro-feature 368 is an indentation or protrusion of well-defined shape and will be referred to as being "at" the major surface 352. The micro-features 368 can be any suitable shape. For example, as shown in FIG. 12, each micro-feature 368 is frustoconical in shape and includes a side surface 370 and an end surface 372. The reference numeral 370 will be generally used to collectively refer to the different embodiments of the side surface, and the reference numeral 372 will be generally used to collectively refer to the different embodiments of the end surface. With additional reference to FIGS. 13 and 14, in other examples, each micro-feature 368 is football-shaped and includes first and second side surfaces 374 and 376 that come together to form an arcuate ridge 378 having ends that intersect the major surface 352. The reference numeral 374 will be generally used to collectively refer to the different embodiments of the first side surface, and the reference numeral 376 will be generally used to collectively refer to the different embodiments of the second side surface. In some embodiments, at least one of the first side surface 374 and the second side surface 376 is curved. In the example shown, both of the first and second side surfaces 374 and 376 are curved. In other embodiments, such as that shown in FIGS. 25-28 of U.S. Pat. No. 6,752,505, at least one of the first side surface 374 and the second side surface 376 is planar. In still other embodiments not specifically shown, the patterning tool 300 includes more than one type of micro-feature 368. In an example, some of the micro-features 368 are frustoconical in shape and others of the micro-features 368 are football-shaped.

The patterning tool 300 includes first micro-features 380 having a low surface roughness. In one embodiment, the low surface roughness is an average surface roughness ($R_l$) less than about 0.10 µm. In another embodiment, the low surface roughness is an average surface roughness ($R_l$) less than about 0.08 µm. In another embodiment, the low surface roughness is an average surface roughness ($R_l$) less than about 0.05 µm.

The patterning tool 300 additionally includes second micro-features 382 each including at least one surface having a high surface roughness. The high surface roughness is greater than the low surface roughness of the first micro-features 380. The high surface roughness of the second micro-feature 382 is a defined roughness intentionally imparted to the at least one surface of each second micro-feature 382. In one embodiment, the high surface roughness is an average surface roughness ($R_h$) ranging from about 1 µm to about 5 µm. In another embodiment, the high surface roughness is an average surface roughness ($R_h$) ranging from about 3 µm to about 5 µm. In another embodiment, the high surface roughness is an average surface roughness ($R_h$) ranging from about 1 µm to about 3 µm.

In some embodiments, the second micro-features 382 have nominally the same surface roughness. In other embodiments, the second micro-features 382 mutually differ in surface roughness, but the difference in the surface roughness among the second micro-features 382 is substantially less than the difference between the average surface roughness ($R_{havg}$) of the high surface roughness surface(s) of the second micro-features 382 and the average surface roughness ($R_{lavg}$) of the first micro-features 380.

FIG. 12 shows exemplary embodiments of frustoconical first micro-feature 380 and frustoconical second micro-feature 382. The first micro-features 380 each include a side surface 367 and an end surface 369. The second micro-features 382 each include a side surface 371 and an end surface 373. The second micro-features 382 have nominally the same shape as the first micro-features 380 shown in FIG. 12. However, the side surface 371 and the end surface 373 of the second micro-features 382 each have a high surface roughness. In the example shown, the high surface roughness is provided by concentric (circumferential) grooves in the side surface 371 and concentric grooves in the end surface 373. In other embodiments, only one of the side surface 371 and the end surface 373 has a high surface roughness.

FIGS. 13 and 14 schematically show exemplary embodiments of football-shaped first micro-features 380 and football-shaped second micro-features 382. The first micro-features 380 each include a first side surface 375 and a second side surface 377. The second micro-features 382 each include a first side surface 379 and a second side surface 381. The football-shaped second micro-features 382 have nominally the same shape as the football-shaped first micro-features 380 shown in FIGS. 13 and 14. However, the second side surface 381 has a high surface roughness greater than the low surface roughness of the first micro-features 380. In the example shown, the high surface roughness is provided by arcuate grooves in the second side surface 381. In other embodiments, both the first side surface 379 and the second side surface 381 of each second micro-feature 382 have a high surface roughness.

The first micro-features 380 and the second micro-features 382 may be arranged at the major surface 352 in any suitable manner. In some embodiments, the micro-features are arranged in a pattern for producing micro-optical elements configured to extract light from the light guide in a defined light intensity profile. The pattern is not necessarily a regular array, and may include randomization of the micro-features 368 at the major surface 352.

In some embodiments, the patterning tool 300 is configured for use in forming the major surface of an optical substrate during manufacture of the optical substrate. Examples of an optical substrate include the light guide 102 and the light redirecting film 146. The optical substrate can be made by such techniques as using the patterning tool 300 as a mold insert and molding the optical substrate as an inverse copy of the patterning tool 300, or by using the patterning tool 300 as an embossing die and embossing a blank optical substrate to form the inverse copy of the patterning tool 300. Each first micro-feature 380 of the patterning tool 300 defines a first micro-optical element 134 of the optical substrate, and each second micro-feature 382 of the patterning tool 300 defines a second micro-optical element 136 of the optical substrate.

In other embodiments, the patterning tool 300 is a master configured for use in making a derivative patterning tool, such as a mother or a shim, for use in forming a major surface of an optical substrate during manufacture of the optical substrate. The mother can be made by such techniques as electroplating the master with metal to form an inverse copy of the master. Each first micro-feature 380 of the master defines a first micro-feature of the mother, and each second micro-feature 382 of the master defines a second micro-feature of the mother. The shim can be made by such techniques as electroplating the mother with metal to form an inverse copy of the mother. Each first micro-feature of the mother defines a first micro-feature of the shim, and each second micro-feature of the mother defines a second micro-feature of the shim. The shim formed by the two stages of electroplating is a copy of the master.

Any one of the master, mother, and shim may be configured as the patterning tool 300 for use in forming the major surface of an optical substrate during manufacture of the optical substrate.

The example of the patterning tool 300 shown in FIG. 12 is a patterning tool used directly or indirectly to make a light guide similar to the light guide 102 described above with reference to FIG. 1. FIG. 12 shows exemplary first and second micro-features 380, 382 at the major surface 352 at different distances from the edge 354 of the patterning tool 300. The edge 354 of the patterning tool 300 corresponds to the light input edge 110 of the light guide 102. At a position 384 proximate the edge 354, the density of the micro-features 368 is lowest, and the percentage of the micro-features 368 that are second micro-features 382 is highest. At a position 386 further from the edge 354, the micro-features 382 have a higher density than at position 384, but the percentage of the micro-features 368 that are second micro-features 382 is lower than at the position 384. At a position 388 still further from the edge 354, the density of the second micro-features 382 is higher than at positions 384 and 386, but the percentage of the micro-features 368 that are second micro-features 382 is lower than at the positions 384 and 386. In the example shown in FIG. 12, none of the micro-features 368 in the region of the major surface 352 shown at position 388 is a second micro-feature 382. The percentage of micro-features 368 that are second micro-features 382 is the number of second micro-features 382 in a unit area of the major surface of the patterning tool 300 multiplied by one hundred and divided by the total number of micro-features 368 in such unit area.

In some embodiments of patterning tool 300 used to make a light guide, the surface roughness of the second micro-features 382 varies with distance from the edge 354 that corresponds to the light input edge of the light guide. The variation in surface roughness may be progressive or step wise. In an example, the second micro-features 382 decrease in surface roughness with increasing distance from the edge 354. In such embodiments, the diffuse component imparted to the light extracted from the resulting light guide by the micro-optical features formed by the second micro-features 382 at a position proximate the edge 354 (e.g., position 384) is greater than the diffuse component imparted to the light extracted from the resulting light guide by the micro-optical features formed by the second micro-features 382 distal the edge 354 (e.g., position 386 or 388).

In some embodiments, at least in a region proximate to the edge 354 that corresponds to the light input of the light guide, the percentage of the micro-features 368 that are second micro-features 382 additionally varies with distance from the edge 356 of the patterning tool 300 adjacent the edge 354. In an example, the percentage of the micro-features 368 that are second micro-features 382 varies with distance from the edge 356. The variation is such that the percentage of the micro-features 368 that are second micro-features 382 is greater in regions of the major surface 352 of the patterning tool that form regions of the major surface of the light guide in front of which the solid-state light emitters will be located than in regions that form regions of the major surface of the light guide mid-way between where the solid-state light emitters will be located. Additionally or alternatively, the surface roughness of the second micro-features 382 varies with distance from the edge 356. In an example, the surface roughness of the second micro-features 382 varies with distance from the edge 356. The variation is such that the surface roughness of the second micro-features is greater in regions of the major surface 352 of the patterning tool that form regions of the major surface of the light guide in front of which the solid-state light emitters will be located than at locations that form regions of the light guide mid-way between where the solid-state light emitters will be located.

In an example of the patterning tool 300 used directly or indirectly to make a light redirecting film similar to the light redirecting film 146 described above with reference to FIG. 10, the percentage of the micro-features 368 that are second micro-features 382 and/or the surface roughness of the second micro-features is typically substantially uniform over the major surface 352 of the patterning tool.

Figure 15:
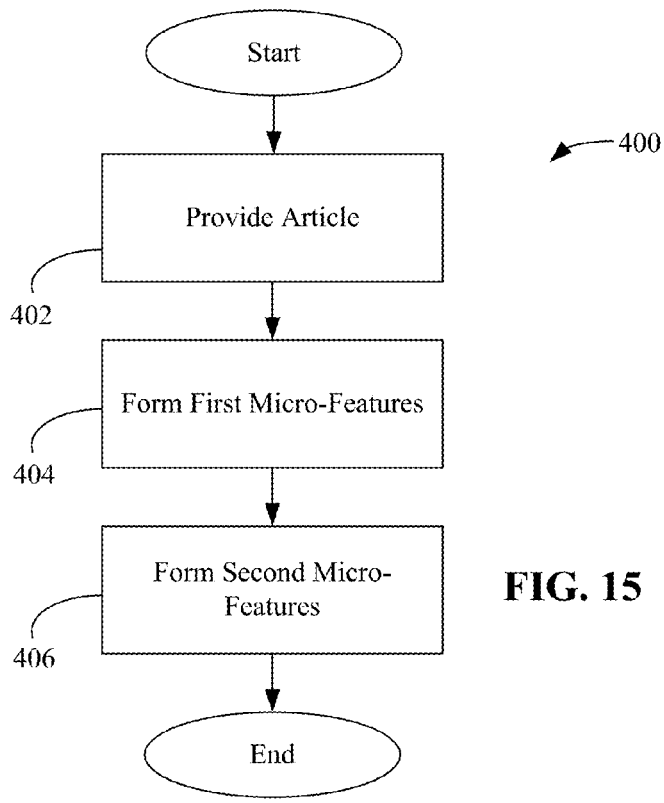
FIG. 15 is a flow chart showing an exemplary method for forming a patterning tool.

FIG. 15 is a flow chart showing an exemplary process 400 for forming the patterning tool. The order of at least some of the operations of process 400 is exemplary, and some of the operations of process 400 can be performed in an order different from that shown, or even concurrently.

In block 402, an article in which the patterning tool 300 is to be formed is provided.

Figure 16:
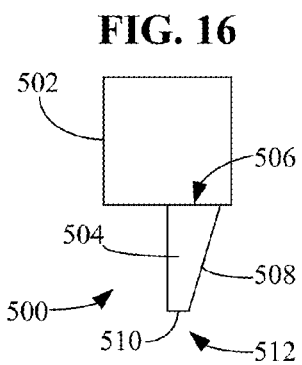
FIGS. 16-21 are schematic views of exemplary micromachining tools.
Figure 19:
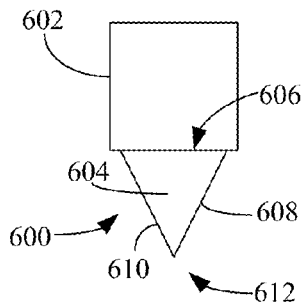

In block 404, the first micro-features 380 having a low surface roughness are formed in the major surface of the article. In an example, the first micro-features 380 are formed by micromachining the article with a micromachining tool 500, 600 (FIGS. 16 and 19). The micromachining tool 500, 600 is configured to form an indentation of well-defined shape extending into the article from the major surface 352 of the article. The surfaces of the indentation have a low surface roughness. The specific type of micromachining tool 500, 600 used depends on the micro-feature to be formed.

In block 406, the second micro-features 382 each including a surface having a high surface roughness are formed at the major surface 352 of the article. In an example, similar to formation of the first micro-features 380, formation of the second micro-features 382 includes micromachining the article with a micromachining tool 520, 540, 620, 640 (FIGS. 17, 18, 20, and 21) to form an indentation of well-defined shape extending into the article from the major surface 352 of the article. At least one surface of the indentation has a high surface roughness.

FIG. 16 shows a micromachining tool 500 embodied as a rotary cutting tool suitable for use in block 404 for machining a frustoconical first micro-feature 380. The micromachining tool 500 includes a machining element 504 coupled to a base 502 at a proximal end 506 of the machining element 504. The machining element 504 includes a first machining edge 510 configured to cut the end surface of the frustrated cone, and a second machining edge 508 configured to cut the side surface of the frustrated cone. The first machining edge 510 and the second machining edge 508 of the micromachining tool 500 intersect at a distal end 512 of the machining element 504, opposite the proximal end 506. The base 502 is configured to couple the rotary cutting tool to an apparatus (e.g., a CNC mill) for machining the article.

FIG. 19 shows a micromachining tool 600 embodied as a linear cutting tool suitable for use in block 404 for machining a football-shaped first micro-feature 380. The micromachining tool 600 includes a machining element 604 coupled to a base 602 at a proximal end 606 of the machining element 604. The machining element 604 includes a first machining edge 610 configured to cut the first surface of the football-shaped micro-feature, and a second machining edge 608 configured to cut the second surface of the football-shaped micro-feature. The first machining edge 610 and the second machining edge 608 intersect at a distal end 612 of the machining element 604, opposite the proximal end 606. The base 602 is configured to couple the linear cutting tool to an apparatus (e.g., a CNC lathe) for machining the article.

The machining element 504, 604 of the micromachining tool 500, 600 is made from a material suitable for use in machining the article to form a surface having a low surface roughness. An exemplary material is monocrystalline diamond. The first machining edge 510, 610 and the second machining edge 508, 608 of the micromachining tool 500, 600 have a low surface roughness. In an example, the first machining edge 510, 610 and the second machining edge 508, 608 are polished edges. In some embodiments, the low surface roughness is an average surface roughness ($R_l$) less than about 0.10 μm. In another embodiment, the low surface roughness is an average surface roughness ($R_l$) less than about 0.08 μm. In another embodiment, the low surface roughness is an average surface roughness ($R_l$) less than about 0.05 μm.

Figure 22:
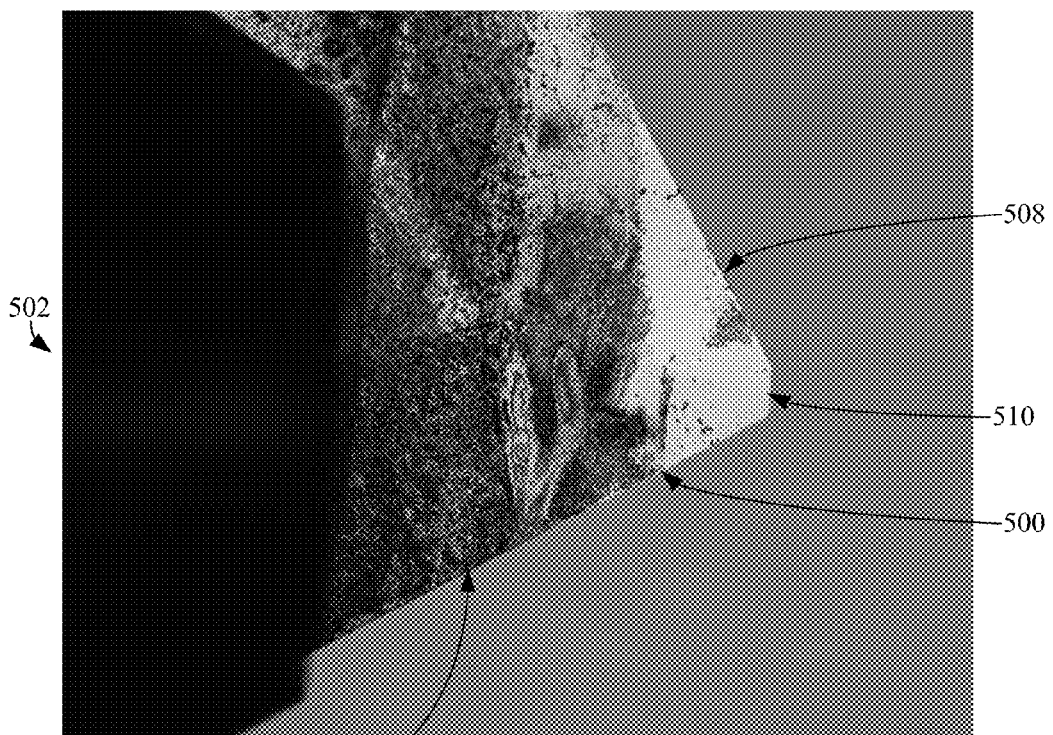
FIGS. 22 and 23 are micrograph images of an exemplary micromachining tool.
Figure 23:
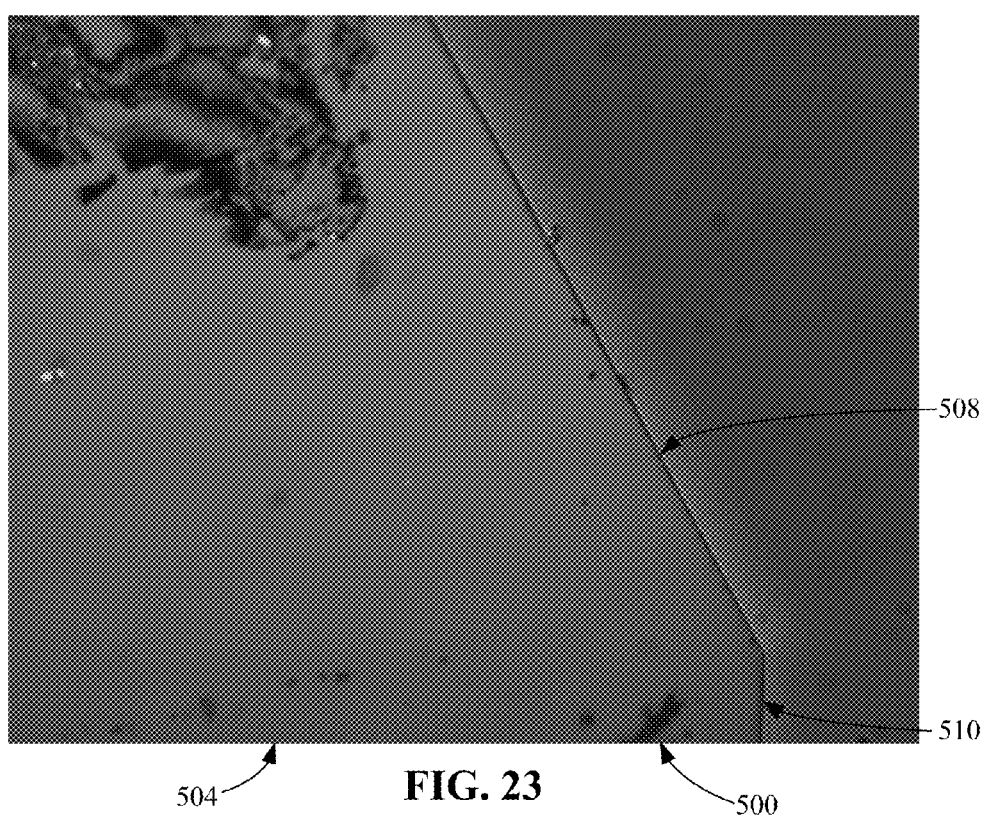

FIGS. 22 and 23 show micrograph images of an example of the micromachining tool 500 described above with reference to FIG. 16. The first machining edge 510 and the second machining edge 508 are configured to machine a frustoconical micro-feature 368 (e.g., a first micro-feature 380) having a low roughness side surface 370 and a low roughness end surface 372.

In some embodiments, the second micro-features 382 are formed by micromachining the article with a micromachining tool 520, 540, 620, 640 having at least one high surface roughness machining edge. In one embodiment, the high surface roughness is an average surface roughness ($R_h$) ranging from about 1 μm to about 5 μm. In another embodiment, the high surface roughness is an average surface roughness ($R_h$) ranging from about 3 μm to about 5 μm. In another embodiment, the high surface roughness is an average surface roughness ($R_h$) ranging from about 1 μm to about 3 μm.

Figure 17:
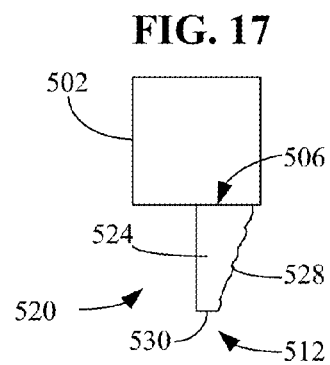
Figure 18:
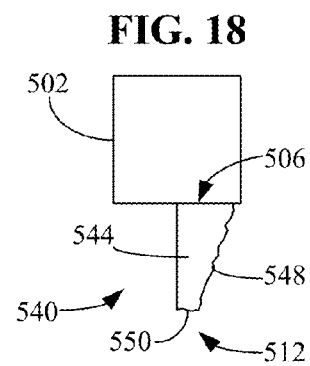

FIGS. 17 and 18 show exemplary micromachining tools 520, 540 embodied as a rotary cutting tool that may be used in block 406 to form frustoconical second micro-features 382. The micromachining tool 520 shown in FIG. 17 includes a machining element 524 having a high surface roughness second machining edge 528 and a low surface roughness first machining edge 530. The micromachining tool 540 shown in FIG. 18 includes a machining element 544 having a high surface roughness second machining edge 548 and a high surface roughness first machining edge 550.

Figure 20:
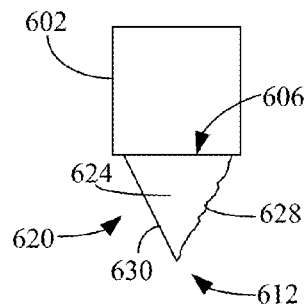
Figure 21:
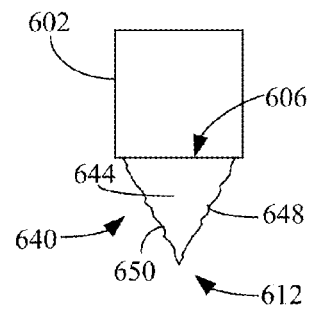

FIGS. 20 and 21 show exemplary micromachining tools 620, 640 embodied as linear cutting tools that may be used in block 406 to form football-shaped second micro-features 382. The micromachining tool 620 shown in FIG. 20 includes a machining element 624 having a high surface roughness second machining edge 628 and a low surface roughness first machining edge 630. The micromachining tool 640 shown in FIG. 21 includes a machining element 644 having a high surface roughness second machining edge 648 and a high surface roughness first machining edge 650. The machining elements 524, 544, 624, 644 of the micromachining tools 500, 600 are made from a material suitable for use in machining the article in a way that provides a high surface roughness. Exemplary materials include polycrystalline diamond, carbide (e.g., silicon carbide, tungsten carbide, and titanium carbide), and metal (e.g., tungsten).

Figure 24:
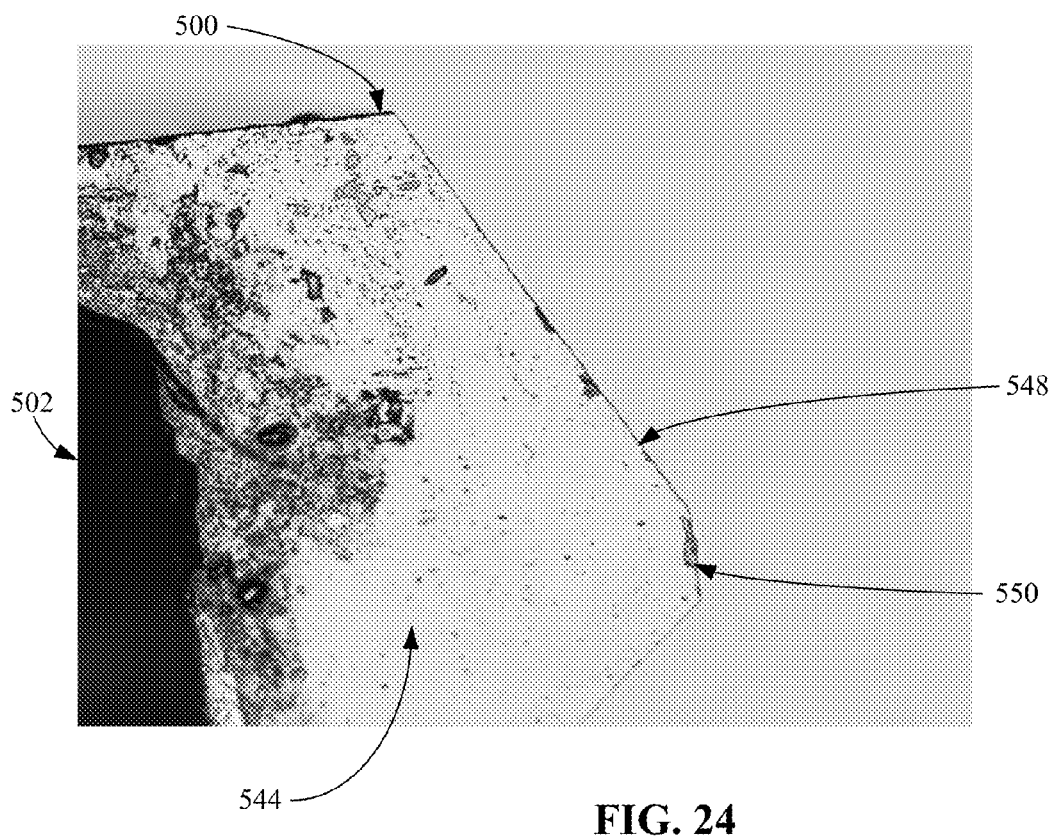
FIGS. 24-26 are micrograph images of another exemplary micromachining tool.
Figure 25:
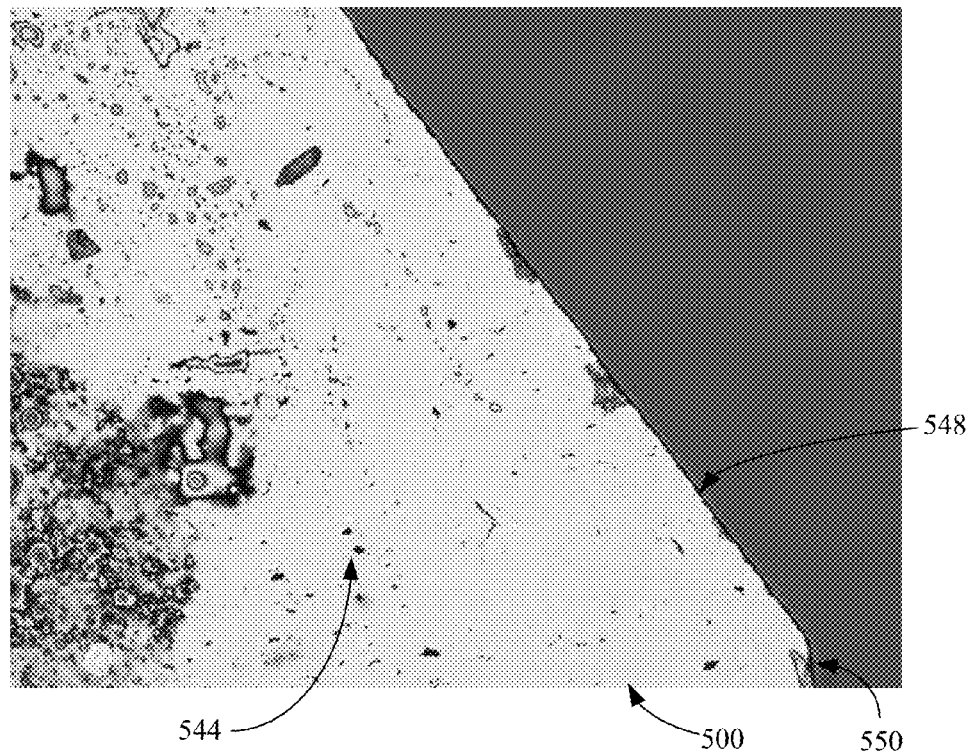
Figure 26:
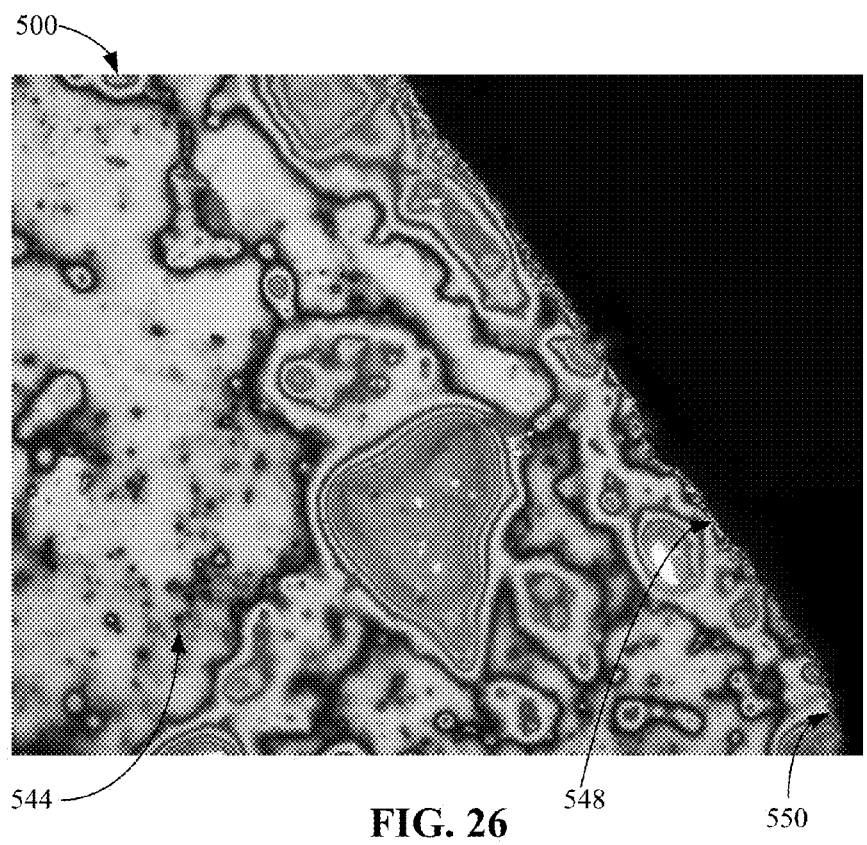

FIGS. 24-26 show micrograph images with progressively increasing magnification of an exemplary micromachining tool embodied as a rotary cutting tool. The micromachining tool shown in FIGS. 24-26 is similar to the micromachining tool 540 shown in FIG. 18. Both the first machining edge 550 and the second machining edge 548 of the machining element 544 include a high surface roughness.

Figure 27:
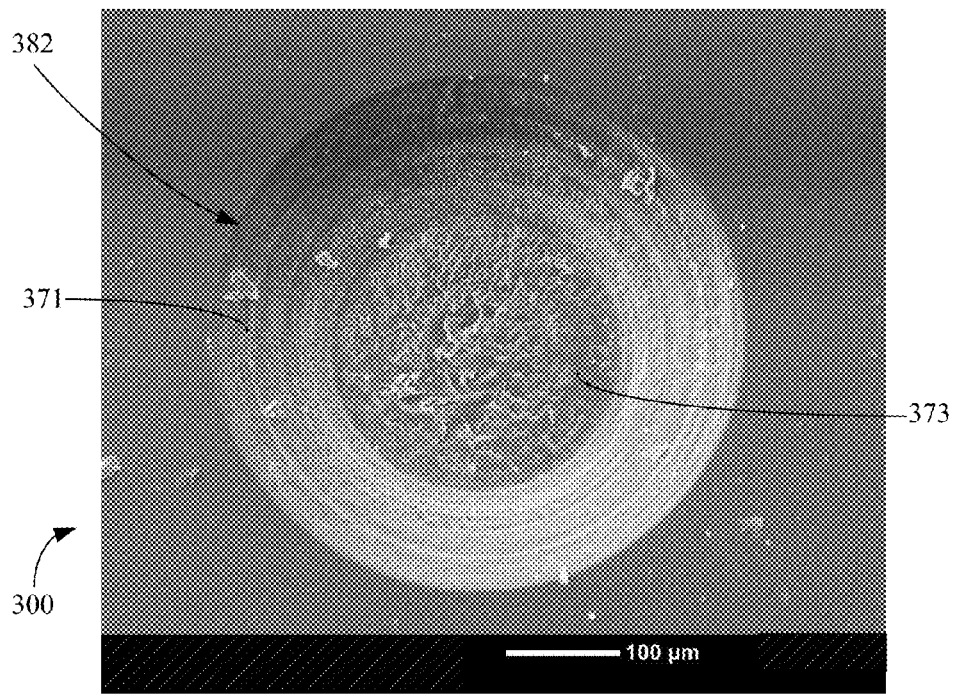
FIGS. 27-29 are SEM images of exemplary micro-features.
Figure 28:
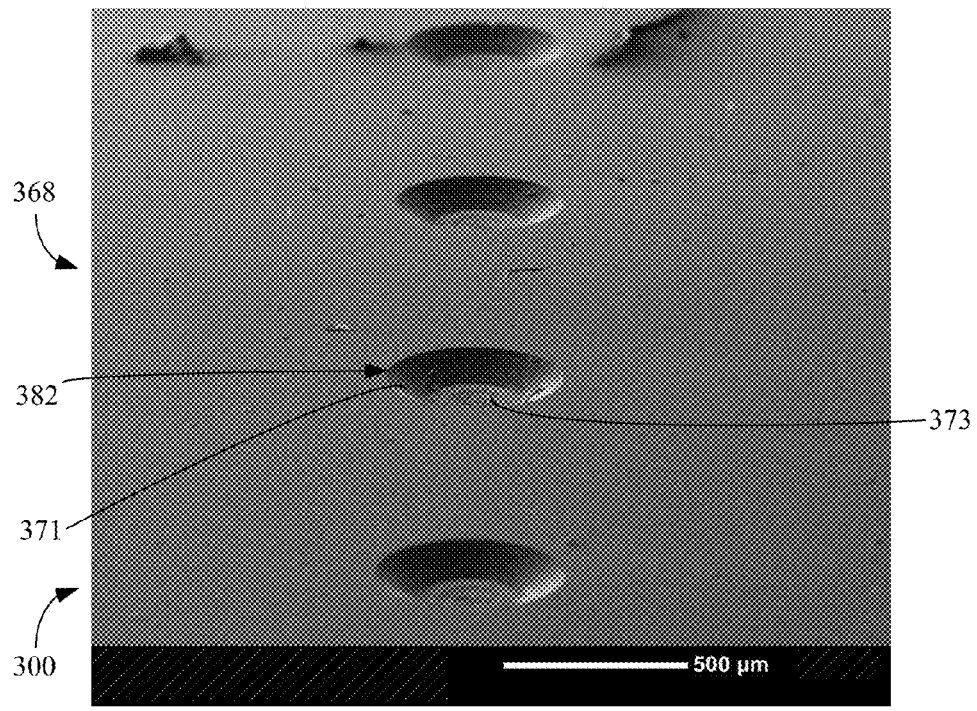
Figure 29:
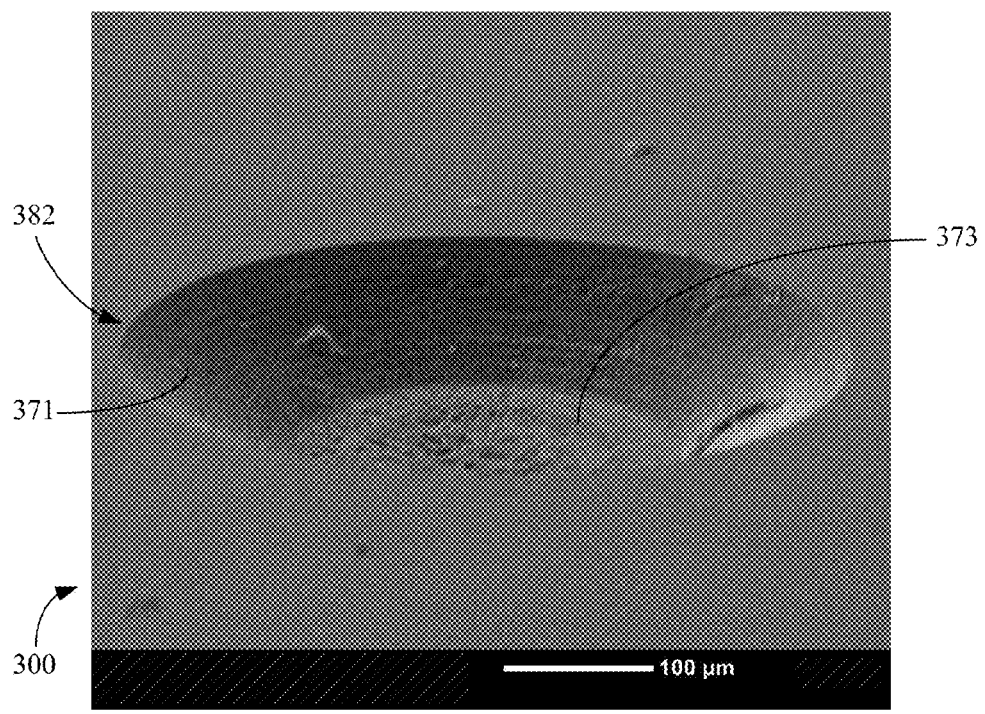

FIGS. 27-29 show exemplary second micro-features 382 machined in the major surface of the article using a micromachining tool similar to that illustrated in FIGS. 18 and 24-26. The second micro-feature 382 is nominally frustoconical in shape and includes a high roughness side surface 371 and a high roughness end surface 373. Concentric (circumferential) grooves are formed at the side surface 371 of the second micro-feature 382 by rotation of the high surface roughness first machining edge 510. The concentric (circumferential) grooves constitute the high surface roughness of the second micro-feature 382. The high surface roughness second machining edge 548 forms a high surface roughness end surface 371. In other embodiments where the second micro-feature is formed using the micromachining tool 620, 640 embodied as a linear cutting tool, arcuate grooves disposed parallel to the ridge 378 (see FIG. 14) are formed at one or both of the first side surface 375 and the second side surface 377 by linear movement of the first machining edge 630, 650 and the second machining edge 628, 648, the grooves constituting the high surface roughness of the second micro-feature 382.

Micromachining the second micro-features 382 using the micromachining tool 520, 540, 620, 640 having at least one high surface roughness machining edge allows for each second micro-optical element 382 to be formed with a defined roughness in a respective single operation. The surface roughness of the machining edges of the micromachining tool predictably defines the surface roughness of the micro-feature.

In other embodiments, the second micro-features 382 are formed in the article by forming micro-features 368 having a low surface roughness, for example, by using a micromachining tool 500, 600 having low surface roughness machining edges (e.g., as shown in FIGS. 16 and 19), and are subsequently roughened using a chemical etching technique. Chemical etching techniques are known in the art, and can be used to impart a desired roughness to the surface of a micro-feature 368 in accordance with such variables as the type and strength of the chemical etchant, the material of the article, the time at which the article is exposed to the chemical etchant, and the temperature of the chemical etchant. Exemplary chemical etching techniques suitable for roughening the second micro-features 382 include wet chemical etching (e.g., solvent based or aqueous based) and reactive ion etching.

Although not specifically shown, in one example, a mask is formed over the major surface of the article. The mask may be formed using a positive resist material or a negative resist material. Portions of the mask are removed to expose those of the micro-features 368 that are to be roughened for form respective second micro-features 382. A chemical etchant is then brought into contact with the unmasked micro-features 368 for the time needed to obtain the defined roughening of the surface of the unmasked micro-features to form respective second micro-features 382. In some embodiments, the article is immersed in a bath including the chemical etchant. Following chemical etching, the etchant is removed, e.g., by washing, and then the mask is removed, e.g., by using a suitable solvent.

In another example, a measured quantity of chemical etchant (e.g., acid) is deposited into the micro-features 368 to be roughened. The chemical etchant is removed, e.g., by washing, after a time sufficient for the chemical etchant to produce the defined surface roughness.

In some embodiments, the defined surface roughness of the respective second micro-features 382 at the major surface 352 of the patterning tool 300 decreases with increasing distance from the edge 354 (FIG. 12), as described above. In the example in which the second micro-features 382 are formed by micromachining with a micromachining tool having a high roughness cutting edge, the second micro-features 382 are formed with multiple micromachining tools, each micromachining tool having different respective high surface roughness. In an example, two micromachining tools are used, where the cutting edge of one has a higher surface roughness than that of the other. The micromachining tool having the cutting edge with the higher high surface roughness is used to form the second micro-features 382 closer to the edge 354, and the micromachining tool having the cutting edge with the lower high surface roughness is used to form the second micro-features 382 further from the edge 354.

In the example in which unmasked micro-features 368 are exposed to a chemical etchant (e.g., by immersion in a bath) to form second micro-features 382 whose surface roughness decreases with increasing distance from the edge 354, the article is oriented with its major surfaces orthogonal to the surface of the chemical etchant and one of its edges (e.g., edge 354) facing the surface of the etchant. The article is then immersed in the chemical etchant at a defined rate, allowed to remain immersed in the etchant for a defined time, which may be zero, and is then rapidly withdrawn from the etchant. Alternatively, the article is rapidly immersed in the chemical etchant, allowed to remain immersed in the etchant for a defined time, which may be zero, and is then withdrawn at a defined rate, or is immersed and withdrawn at defined rates. The defined rate of immersion and/or withdrawal varies the time that different regions of the major surface of the article are exposed to the chemical etchant, the exposure time being a function of the proximity to the edge (e.g., edge 354) that is initially immersed in the etchant.

In the example in which the second micro-features 382 are formed by depositing chemical etchant into the micro-features 368, the time before the chemical etchant is removed may decrease with increasing distance from the edge. In an example, the chemical etchant is deposited in those micro-features 368 proximate the edge 354 prior to being deposited in those micro-features 368 distal the edge 354. Later, the chemical etchant deposited in all the micro-features 368 is removed at the same time.

Any of the processes described above for forming first micro-features 380 and second micro-features 382 may also be used to form first micro-optical elements 134 and second micro-optical elements 136 at the major surface 106 of an optical substrate embodied as a light guide 102 or a light redirecting film 146.

Figure 30:
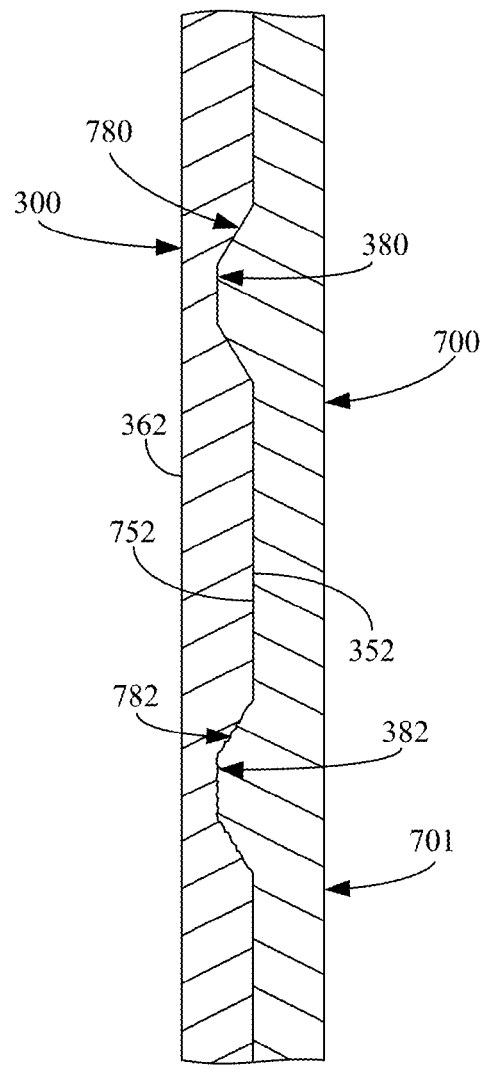
FIGS. 30 and 31 are schematic cross-sectional views of exemplary patterning tools for use in making an optical substrate.

As described above, in some embodiments, the patterning tool 300 is a master used for making a mother or a shim. FIG. 30 shows an exemplary embodiment of a mother 700 formed on the major surface 352 of a patterning tool 300. In an example, the mother 700 is formed by an electroplating process. Electroplating processes are known in the art and can be used to apply an electroplated layer 701 to the major surface 352 of the patterning tool 300. When removed from the patterning tool 300, the electroplated layer 701 constitutes the mother 700, and is an inverse copy of the master. Accordingly, the major surface 752 of the mother 700 includes first micro-features 780 that are inverse of the first micro-features 380, and second micro-features 782 that are inverse of the second micro-features 382. In embodiments in which the micro-features 368 at the major surface of the patterning tool 300 are indentations of well-defined shape, the inverse micro-features 768 at the major surface 752 of the mother 700 are protrusions of well-defined shape. FIGS. 33-36 are SEM images specifically showing exemplary embodiments of the second micro-features 782 embodied as protrusions at the major surface 752 of the mother 700.

Figure 31:
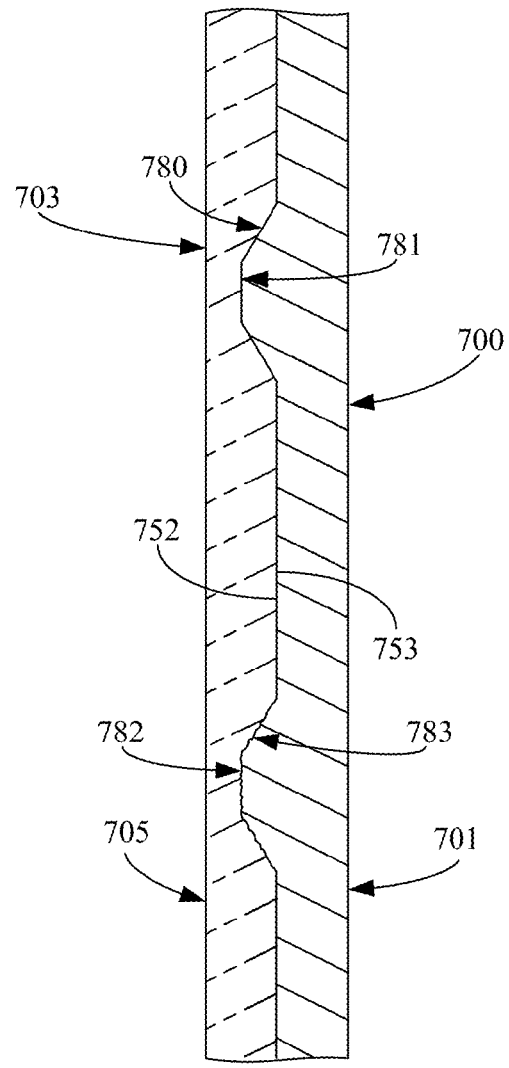
Figure 32:
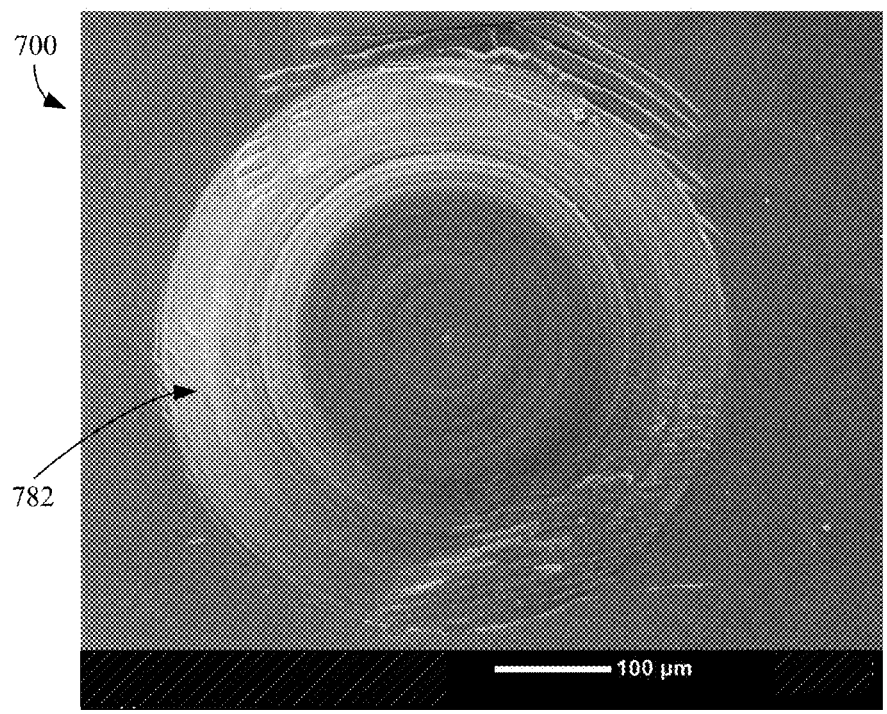
FIGS. 32-36 are SEM images of exemplary micro-features.
Figure 33:
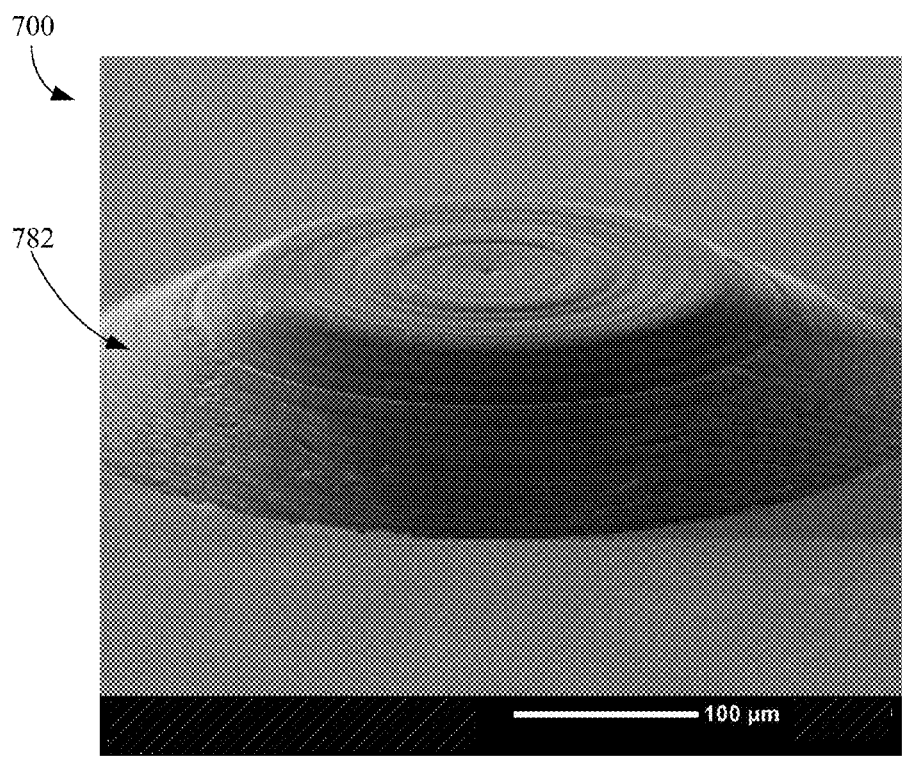
Figure 34:
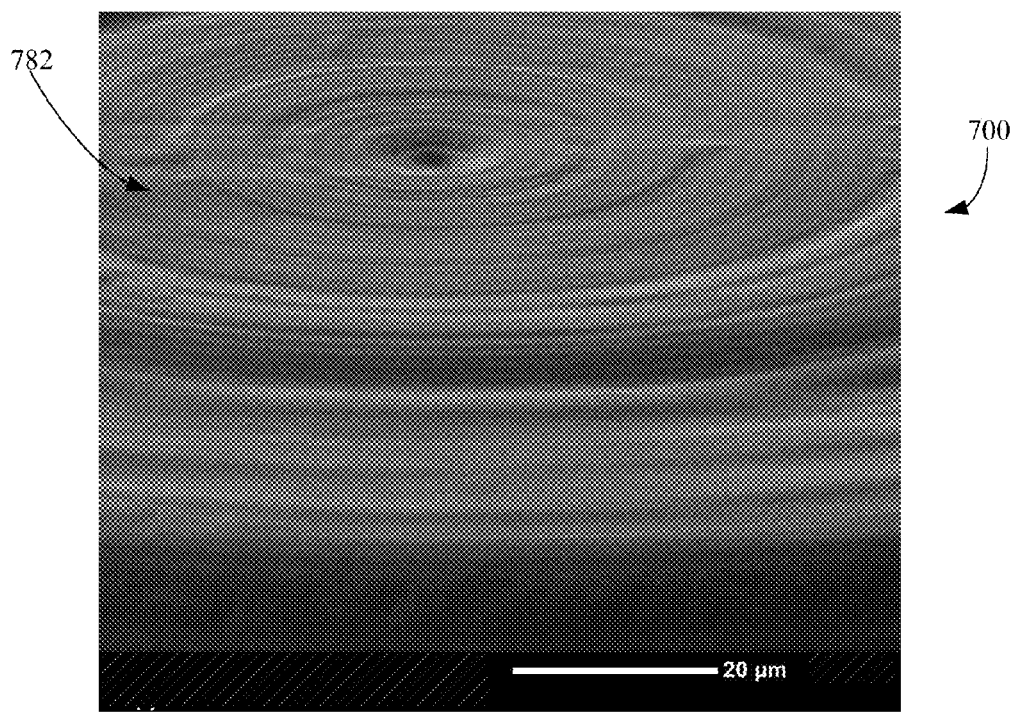
Figure 35:
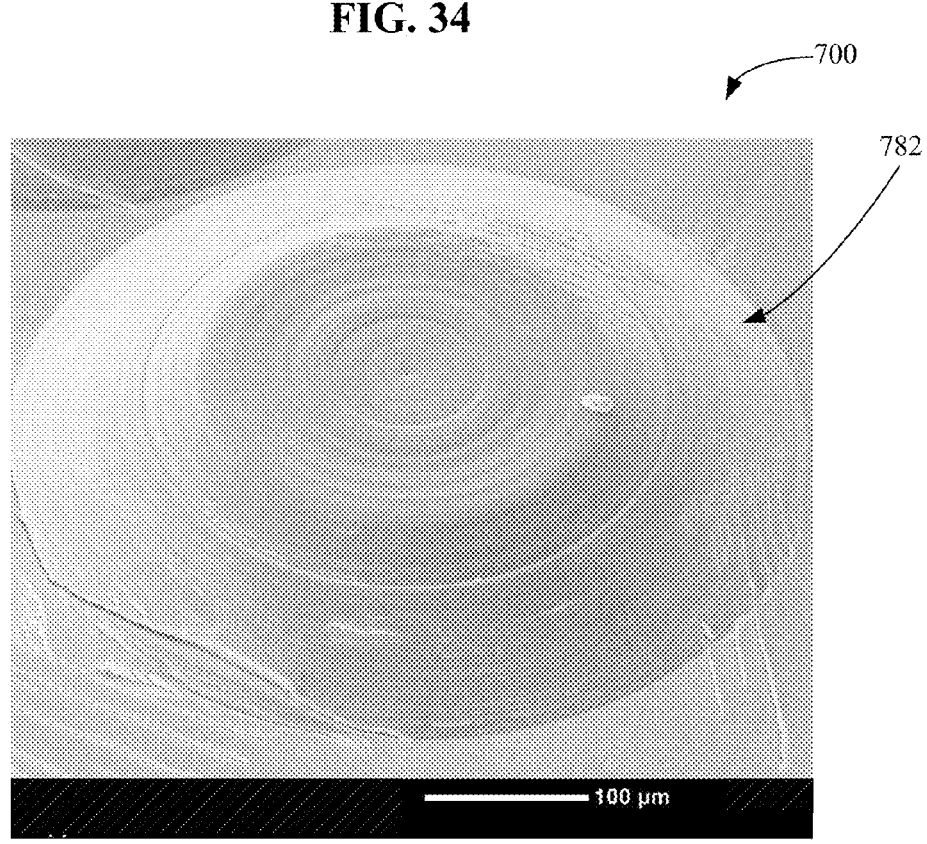
Figure 36:
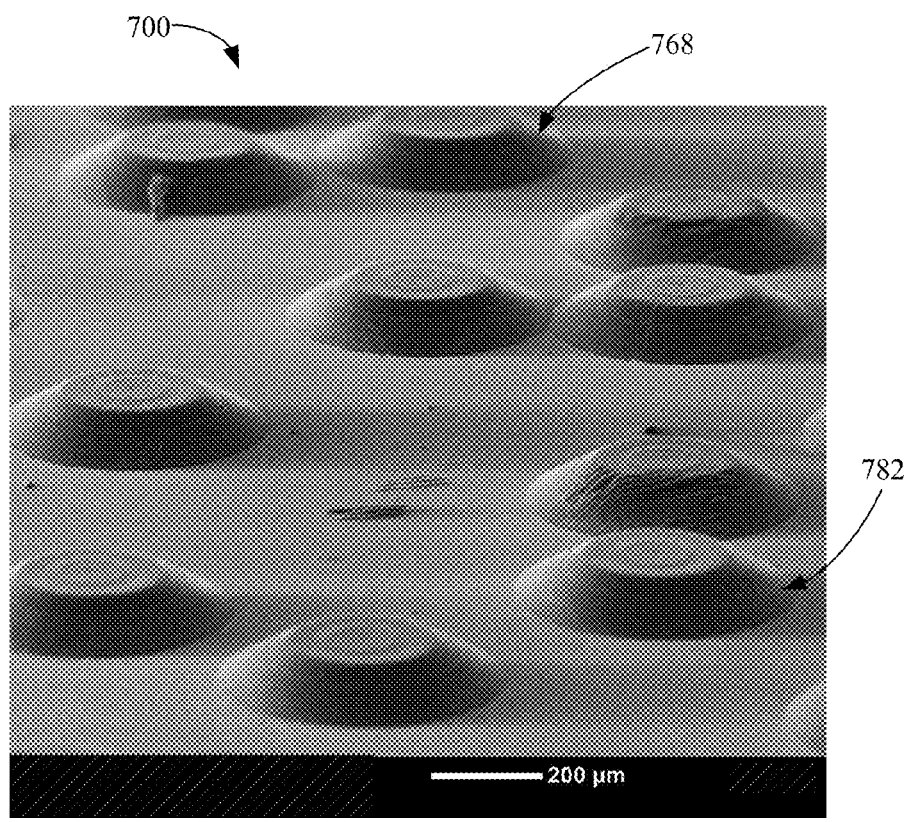

To produce a shim in which the micro-features are indentations, two consecutive electroplating processes are used. FIG. 31 shows an exemplary embodiment of a shim 703 formed as an electroplated layer 705 on the major surface 752 of a mother 700. In an example, the shim 703 is formed by an electroplating process. When removed from the mother 700, the electroplated layer 705 constitutes the shim 703. The shim 703 is an inverse copy of the mother 700 and is a copy of the master. Accordingly, the shim 703 includes at its major surface 753 first micro-features 781 that are respective inverse copies of the first micro-features 780 of the mother 700 and second micro-features 783 that are respective inverse copies of the second micro-features 782 of the mother 700.

Figure 37:
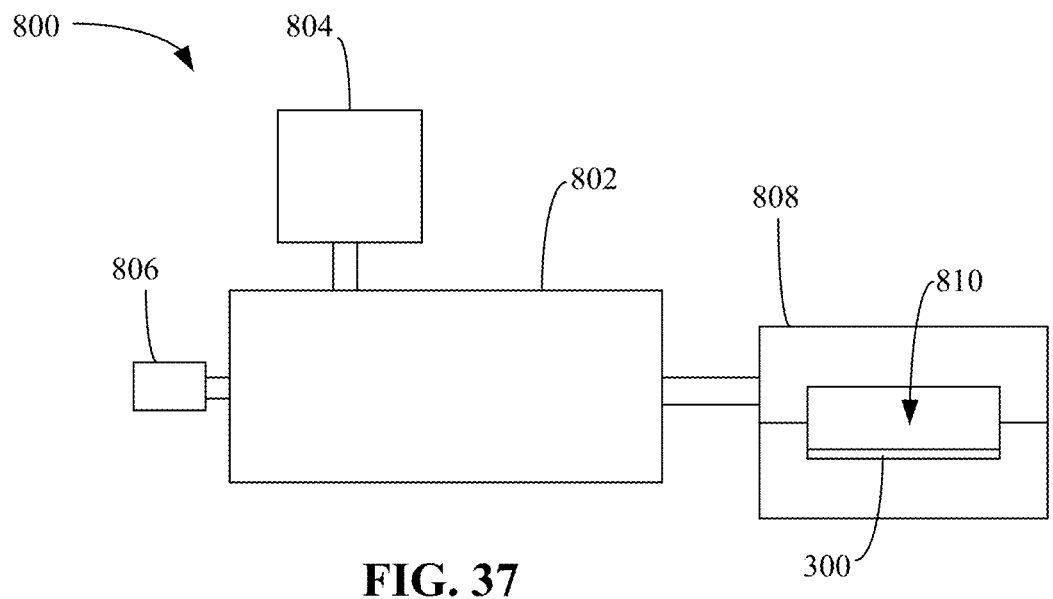
FIG. 37 is a schematic view of parts of an exemplary injection molding apparatus.

In some embodiments, the light guide 102 (FIG. 1) including the first micro-optical elements 134 and the second micro-optical elements 136 is formed by an injection molding process. FIG. 37 schematically shows an exemplary injection molding apparatus 800. The injection molding apparatus 800 includes a heated screw injector 802 that is fed by a hopper 804 and is driven by a motor 806 to inject molten material into a mold 808. The mold 808 includes a mold cavity 810 that defines the shape of the formed light guide 102. Referring additionally to FIGS. 12, 13, 30, and 31, a patterning tool 300 (e.g., a master, mother, or shim) is installed in the mold cavity 810, the patterning tool 300 including a major surface having first micro-features and second micro-features. The injector 802 is used to inject molten material into the mold cavity 810 of the injection molding apparatus 800. The molten material can be any suitable material for forming a light guide such as acrylic, polycarbonate, PMMA, glass, or other appropriate material. The injection brings the injected material into contact with the patterning tool 300, and the major surface 106 or 108 of the light guide 102 is formed as an inverse of the patterning tool 300. The light guide 102 includes first and second micro-optical elements 134, 136. Following injection, the material is allowed to cool and the light guide 102 is then removed from the injection molding apparatus 800.

Figure 38:
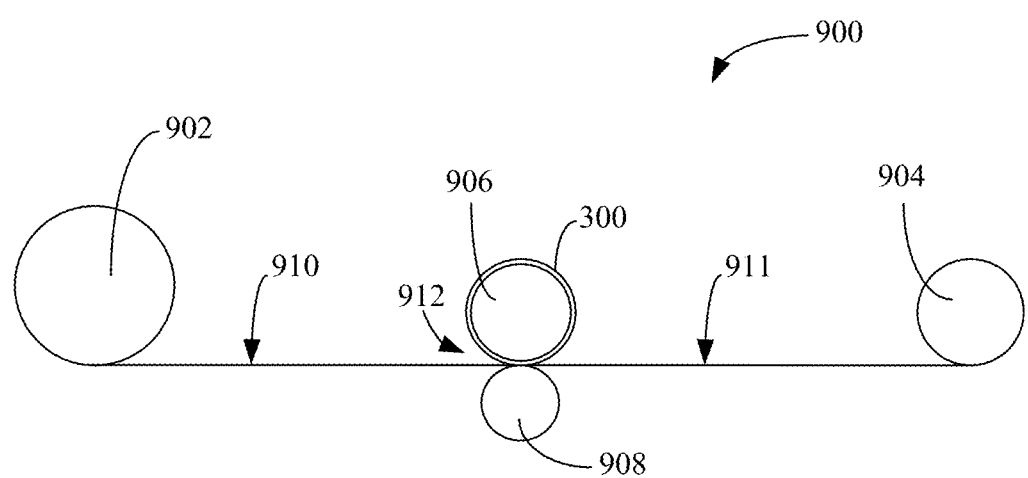
FIG. 38 is a schematic view of parts of an exemplary roll-to-roll embossing apparatus.

In some embodiments, the light redirecting film 146 (FIG. 10) including the first micro-optical elements 134 and the second micro-optical elements 136 is formed by an embossing process. FIG. 38 shows an exemplary roll-to-roll embossing apparatus 900. The embossing apparatus 900 includes a supply roller 902 for retaining stock material 910, and a take-up roller 904 downstream from the supply roller 902 for collecting the embossed material 911. In other embodiments, the embossing assembly 900 includes a cutting assembly (not shown) in place of the take-up roller 904, the cutting assembly configured to cut the embossed material 911 to a desired size. Although not specifically shown, the embossing assembly 900 may include one or more pairs of support rollers, tension rollers, and/or drive rollers for effectuating transfer of the stock material 910 from the supply roller 902 to the take-up roller 904. The patterning tool 300 (e.g., a master, mother, or shim) is wrapped around a single embossing roller 906 (as shown) or may be formed into a belt wrapped around two rollers for embossing the stock material 910. The embossing roller 906 is located between the supply roller 902 and the take-up roller 904. A second roller 908 presses against the patterning tool 300 on the embossing roller 906 and forms a nip 912 through which the stock material 910 passes. The pressure applied by the second roller 908 causes the stock material 910 passing through the nip 912 to be embossed with the inverse of the pattern provided on the patterning tool 300. At least one of the embossing roller 906 and the second roller 908 is heated, or a heating assembly (not shown) is provided upstream from the embossing roller, to soften the stock material 910 and aid in formation of the micro-optical elements 134, 136.

In this disclosure, the phrase "one of" followed by a list is intended to mean the elements of the list in the alternative. For example, "one of A, B and C" means A or B or C. The phrase "at least one of" followed by a list is intended to mean one or more of the elements of the list in the alternative. For example, "at least one of A, B and C" means A or B or C or (A and B) or (A and C) or (B and C) or (A and B and C).

What is claimed is:

1. An article of manufacture, comprising:
a substrate having a major surface;
a plurality of distinct first micro-features of well-defined shape at the major surface of the substrate, each of the first micro-features embodied as a three-dimensional feature recessed into or protruding from the major surface and having a distinct surface on a scale larger than the surface roughness of the surface of the first micro-feature, the surface of the respective first micro-features having a low surface roughness; and
a plurality of distinct second micro-features of well-defined shape at the major surface of the substrate, each of the second micro-features embodied as a three-dimensional feature recessed into or protruding from the major surface and having a distinct surface on a scale larger than the surface roughness of the surface of the second micro-feature, the surface of the respective second micro-features comprising a high surface roughness substantially greater than the low surface roughness,
wherein the surface of each of the second micro-features is a first surface and each of the second micro-features additionally comprises a second surface that comes together with the first surface to form a ridge having ends that intersect the major surface, the first surface and the second surface each having the high surface roughness.

2. The article of manufacture of claim 1, wherein the high surface roughness is an average surface roughness ranging from about 1 μm to about 5 μm and the low surface roughness is an average surface roughness less than about 0.10 μm.

3. An article of manufacture, comprising:
a substrate having a major surface;
a plurality of distinct first micro-features of well-defined shape at the major surface of the substrate, each of the first micro-features embodied as a three-dimensional feature recessed into or protruding from the major surface and having a distinct surface on a scale larger than the surface roughness of the surface of the first micro-feature, the surface of the respective first micro-features having a low surface roughness; and
a plurality of distinct second micro-features of well-defined shape at the major surface of the substrate, each of the second micro-features embodied as a three-dimensional feature recessed into or protruding from the major surface and having a distinct surface on a scale larger than the surface roughness of the surface of the second micro-feature, the surface of the respective second micro-features comprising a high surface roughness substantially greater than the low surface roughness,
wherein the surface of each of the second micro-features is a first surface and each of the second micro-features additionally comprises a second surface that comes together with the first surface to form a ridge having ends that intersect the major surface, the first surface having the high surface roughness and the second surface having a low surface roughness less than the high surface roughness.

4. The article of manufacture of claim 1, wherein:
the first micro-features and the second micro-features are present together at a first region of the major surface near an edge of the substrate;
the first micro-features and the second micro-features are present together at a second region of the major surface further from the edge of the substrate than the first region; and
the second micro-features are greater in density than the first micro-features in the first region than in the second region.

5. The article of manufacture of claim 1, wherein the second micro-features decrease in surface roughness with increasing distance from an edge of the substrate.

6. A lighting assembly, comprising:
the article of manufacture of claim 1; and
solid-state light emitters to edge light the article of manufacture along an edge of the article of manufacture, wherein
the article of manufacture is a light guide and the micro-features are micro-optical elements;
the first micro-features and the second micro-features are present together at a first region of the major surface near the edge;
the first micro-features and the second micro-features are present together at a second region of the major surface further from the edge than the first region; and
a percentage of the micro-features that are the second micro-features decreases with increasing distance from the edge such that a percentage of the second micro-features from among the first and second micro-features at the first region is greater than a percentage of the second micro-features from among the first and second micro-features at the second region.

7. A lighting assembly, comprising:
the article of manufacture of claim 1; and
solid-state light emitters to edge light the article of manufacture along an edge of the article of manufacture, wherein
the article of manufacture is a light guide and the micro-features are micro-optical elements; and
the second micro-features decrease in surface roughness with increasing distance from the edge.

8. A lighting assembly, comprising:
the article of manufacture of claim 1, wherein the article of manufacture is a light guide and the micro-features are micro-optical elements; and
solid-state light emitters to edge light the light guide along an edge of the light guide, wherein:
the first micro-features and the second micro-features are present together at a first region of the major surface in front of one of the solid-state light emitters;
the first micro-features and the second micro-features are present together at a second region of the major surface at a location approximately mid-way between adjacent solid-state light emitters; and
a percentage of the micro-features that are the second micro-features varies with increasing distance from the edge such that a percentage of the second micro-optical elements from among the first and second micro-features at the first region is greater at the first region than a percentage of the second micro-features from among the first and second micro-features at the second region.

9. A lighting assembly, comprising:
the article of manufacture of claim 1, wherein the article of manufacture is a light guide and the micro-features are micro-optical elements; and
solid-state light emitters to edge light the light guide along an edge of the light guide, wherein the second micro-features vary in surface roughness with increasing distance from the edge such that the surface roughness of the second micro-optical elements is greater in front of each solid-state light emitter than at locations approximately mid-way between adjacent solid-state light emitters.

10. The article of manufacture of claim 1, wherein the article of manufacture is a patterning tool for use in making an optical substrate to form at a major surface of the optical substrate first micro-optical elements of well-defined shape defined by the first micro-features and second micro-optical elements of well-defined shape defined by the second micro-features.

11. The article of manufacture of claim 1, wherein the substrate is a light guide, the first micro-features are first micro-optical elements having a low surface roughness and the second micro-features are second micro-optical elements comprising a surface having a high surface roughness.

12. The article of manufacture of claim 11, wherein:
the first micro-optical element extracts light from the light guide with a first light ray angle distribution; and
the second micro-optical element extracts light from the light guide with a second light ray angle distribution broader than the first light ray angle distribution.

13. The article of manufacture of claim 1, wherein the substrate is a light redirecting film, the first micro-features are first micro-optical elements having a low surface roughness and the second micro-features are second micro-optical elements comprising a surface having a high surface roughness.

14. The article of manufacture of claim 1, wherein:
each of the first micro-features comprises a plurality of distinct surfaces on a scale larger than the surface roughness of the surface of the first micro-feature; and
each of the second micro-features comprises a plurality of distinct surfaces on a scale larger than the surface roughness of the surface of the second micro-feature.

15. The article of manufacture of claim 1, wherein a percentage of the second micro-features from among the first and second micro-features is substantially uniform over the major surface.

16. The article of manufacture of claim 1, wherein for each of the plurality of second micro-features, a larger of a length and width of the micro-feature is less than one-half of the smaller of a length and width of the substrate.

17. An article of manufacture, comprising:
a substrate having a major surface;
a plurality of distinct first micro-features of well-defined shape at the major surface of the substrate, each of the first micro-features embodied as a three-dimensional feature recessed into or protruding from the major surface and having a distinct surface on a scale larger than the surface roughness of the surface of the first micro-feature, the surface of the respective first micro-features having a low surface roughness; and
a plurality of distinct second micro-features of well-defined shape at the major surface of the substrate, each of the second micro-features embodied as a three-dimensional feature recessed into or protruding from the major surface and having a distinct surface on a scale larger than the surface roughness of the surface of the second micro-feature, the surface of the respective second micro-features comprising a high surface roughness substantially greater than the low surface roughness,
wherein:
a shape of each of the plurality of first micro-features is nominally the same as a shape of each of the plurality of second micro-features, with the surface of the respective first micro-features having the low surface roughness and the surface of the respective second micro-features having the high surface roughness;
the surface of each of the first micro-features is a first surface and each of the first micro-features additionally comprises a second surface that comes together with the first surface to form a ridge having ends that intersect the major surface; and
the surface of each of the second micro-features is a first surface and each of the second micro-features additionally comprises a second surface that comes together with the first surface to form a ridge having ends that intersect the major surface.

18. The article of manufacture of claim 3, wherein the substrate is a light guide, the first micro-features are first micro-optical elements having a low surface roughness and the second micro-features are second micro-optical elements comprising a surface having a high surface roughness.

19. The article of manufacture of claim 3, wherein the substrate is a light redirecting film, the first micro-features are first micro-optical elements having a low surface roughness and the second micro-features are second micro-optical elements comprising a surface having a high surface roughness.

20. The article of manufacture of claim 17, wherein the substrate is a light guide, the first micro-features are first micro-optical elements having a low surface roughness and the second micro-features are second micro-optical elements comprising a surface having a high surface roughness.

21. The article of manufacture of claim 17, wherein the substrate is a light redirecting film, the first micro-features are first micro-optical elements having a low surface roughness and the second micro-features are second micro-optical elements comprising a surface having a high surface roughness.

\* \* \* \* \*